(12) United States Patent
Gerth et al.

(10) Patent No.: US 12,390,315 B2
(45) Date of Patent: *Aug. 19, 2025

(54) SPLIT DENTURE

(71) Applicant: exocad GmbH, Darmstadt (DE)

(72) Inventors: Maik Gero Gerth, Seeheim-Jugenheim (DE); Thanh T Nguyen, Anaheim, CA (US); Wang Kui, Shenzhen (CN)

(73) Assignee: exocad GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,735

(22) Filed: Jan. 19, 2024

(65) Prior Publication Data
US 2024/0189080 A1 Jun. 13, 2024

Related U.S. Application Data

(62) Division of application No. 17/069,024, filed on Oct. 13, 2020, now Pat. No. 11,903,781.

(51) Int. Cl.
*A61C 13/34* (2006.01)
*A61C 13/00* (2006.01)
*A61C 13/24* (2006.01)

(52) U.S. Cl.
CPC .......... *A61C 13/34* (2013.01); *A61C 13/0019* (2013.01); *A61C 13/24* (2013.01)

(58) Field of Classification Search
CPC ..... A61C 13/01; A61C 13/34; A61C 13/0019; A61C 13/0004; A61C 9/004
USPC ......................................................... 345/418
See application file for complete search history.

(56) References Cited

U.S. PATENT DOCUMENTS

| | | | |
|---|---|---|---|
| 10,080,630 | B2 | 9/2018 | Heffelfinger |
| 2006/0121408 | A1 | 6/2006 | Hedge et al. |
| 2010/0317763 | A1 | 12/2010 | Rajaiah et al. |
| 2012/0258430 | A1 | 10/2012 | Ruppert et al. |
| 2015/0327962 | A1 | 11/2015 | Ginsburg et al. |
| 2019/0105133 | A1* | 4/2019 | Nakao ............... A61C 13/01 |

(Continued)

FOREIGN PATENT DOCUMENTS

| | | |
|---|---|---|
| DE | 10009906 C1 | 6/2001 |
| EP | 3603568 A1 | 2/2020 |
| WO | WO-2021/058643 A1 | 4/2021 |

OTHER PUBLICATIONS

Dai N, Yu X, Sun Y. Gingival morphology-controlled design of the complete denture baseplate. International Journal for Numerical Methods in Biomedical Engineering. Feb. 2018;34(2):e2911.*

(Continued)

*Primary Examiner* — Phu K Nguyen
(74) *Attorney, Agent, or Firm* — Harness, Dickey & Pierce, P.L.C.

(57) ABSTRACT

The invention relates to a method for configurating a split denture. A digital 3D model of the denture comprising a plurality of teeth is provided. The digital 3D model of the denture is split into a digital 3D model of a base part and a digital 3D model of a teeth part. The base part comprises a first artificial gingiva portion. Further, the base part is configured to support the teeth part. The teeth part comprises the plurality of teeth of the denture and a second gingiva portion. The teeth part is configured to be mounted on the base part. The digital 3D model of the split denture is provided for generating at least one of the base part and the teeth part.

8 Claims, 14 Drawing Sheets

(56) References Cited

U.S. PATENT DOCUMENTS

2020/0022790 A1   1/2020  Fisker
2022/0110730 A1*  4/2022  Gerth ................ A61C 13/0001
2023/0157796 A1*  5/2023  Kohnen ............. A61C 13/0004
                                                            433/213

OTHER PUBLICATIONS

International Search Report and Written Opinion for PCT/EP2021/078697 dated Dec. 9, 2021.

Mendoza AR, Tomlinson MJ. The split denture: a new technique for artificial saliva reservoirs in mandibular dentures. Australian dental journal. Sep. 2003;48(3):190-4.

Zuckerman GE. A reliable method for securing anterior denture teeth in denture bases. The Journal of prosthetic dentistry. Jun. 1, 2003;89(6):603-7.

* cited by examiner

SPLIT DENTURE

CROSS-REFERENCE TO RELATED APPLICATION

This application is a divisional of U.S. application Ser. No. 17/069,024, filed Oct. 13, 2020, the disclosure of which is incorporated herein by reference in its entirety.

The invention relates to the field of dental technology. More particularly, the invention relates to a method for configurating a split denture. The invention furthermore relates to a system and a computer program product for configurating a split denture as well as a split denture.

Dentures are prosthetic devices used to replace missing teeth and supported by the surrounding soft and hard tissues of the oral cavity of a patient. A denture may have to meet several requirements: the fit on the supporting tissue should be comfortable and tight; the occlusion of artificial teeth provided by the denture should be adjusted to the patient's individual stomatognathic system; the denture should ensure suitable phonetic capabilities, i.e., the patient should be able to speak clearly; finally, the appearance of the dentures should be satisfying. A denture may be required to be satisfying mechanically, phonetically as well as aesthetically. However, individual physiological preconditions may differ from patient to patient significantly. Therefore, a complex, time-consuming and expensive adjustment procedure, which often comprises multiple steps, i.e., multiple visits at a dentist, may be necessary to adjust a denture to the individual requirements of an individual patient.

It is an objective to provide for a method, a system, a computer program product for configurating a split denture as well as a split denture.

In one aspect, the invention relates to a method for configurating a split denture. The method comprises providing a digital 3D model of a denture. The denture comprises a plurality of teeth. The digital 3D model of the denture is split into a digital 3D model of a base part and a digital 3D model of a teeth part. The base part comprises a first artificial gingiva portion. Furthermore, the base part is configured to support the teeth part. The teeth part comprises the plurality of teeth of the denture and a second gingiva portion. Furthermore, the teeth part is configured to be mounted on the base part. The digital 3D model of the split denture is provided for generating at least one of the base part and the teeth part.

A split denture may provide several beneficial effects. Splitting the denture into a base part and a teeth part may allow to generate, i.e., manufacture, the two parts independently from each other. For example, the base part may be generated using a harder material or harder combination of materials enabling a tight fit to the natural tissues of the oral cavity. Using a hard material, a rigid base part may be provided, which enables a sucking effect based on a suction pressure. This sucking effect may ensure a tight fit of the base part on the natural tissues. Furthermore, using a hard material for the base part may provide a stable base for the teeth part. On the other hand, the teeth part may be generated using a softer material or softer combination of materials compared to the material or combination of materials used for the base part. The softer material may allow for adjustments by a dentist. For example, the dentist may perform adjustments to improve the occlusion, the phonetics, the comfort and/or the appearance of the denture. The softer material of the teeth part may have a desired abrasion allowing the dentist to remove some of the material in order to locally alter the shape of the teeth part. For example, the softer material may be warmed by the dentist in order to increase its deformability enabling the dentist to alter the shape of the teeth part, e.g., by deforming the same. When the warmed material is cooled down again, the deformability may be reduced again, preventing any accidental deformations. The softer material may, e.g., be wax adjusted by the dentist using a standard wax knife.

Furthermore, a split denture may allow for an exchange of the teeth part. Thus, different types of teeth parts may be tested. For example, the design of the teeth and/or the design of the artificial gingiva of the teeth part may differ. Different types of artificial teeth may be tested, which may, e.g., differ in form, size and/or color. For example, sets of teeth from different tooth libraries may be compared. Furthermore, the position of the teeth may differ. For example, the bite height of the different teeth parts may differ. For example, the smile line of the different teeth parts may differ. Smile line refers to an imaginary line along the incisal edges of the maxillary anterior teeth. The smile line should mimic the curvature of the superior border of the lower lip while smiling. For example, the different teeth parts may differ in the extent of the maxillary anterior teeth and/or the extent of the mandibular anterior teeth being visible, when the patient smiles. The visible maxillary anterior teeth may be the maxillary anterior teeth of the respective teeth part. For example, the different teeth parts may differ in the extent of the maxillary anterior gingiva being visible, when the patient smiles. The visible maxillary anterior gingiva may be an anterior portion of the artificial gingiva of the respective teeth part.

Exchanging only the teeth parts for testing different versions of the denture instead of exchanging the complete denture may save production material, time and costs. For example, production time and try-in time may be saved, when the patient wants to try different, e.g., bite heights or different designs. The base part may be a patient individual base part with a form and a support surface adjusted to the tissue in the patient's mouth on which the denture is placed. For example, scan data from an intraoral scan of the patient's mouth or scan data from a scan of an impression of the patient's jaws may be used to determine the geometry of the support surface. The support surface may have a geometry which is a negative of the geometry of the patient's natural tissue defined by the scan data. The teeth parts may be patient individual teeth parts as well or may be generic teeth parts.

In case of patient individual teeth parts, the respective teeth parts may be generated together with the base part. Each of the patient individual teeth parts may be configured to fit on a mounting surface provided by the patient individual base part for mounting the teeth parts on the respective patient individual base part. In case of generic teeth parts, the teeth parts may be provided in form of pre-manufactured teeth parts. The base part may comprise a generic mounting surface for mounting the pre-manufactured teeth parts on the patient individual base part.

The split of the denture may extend through the artificial gingiva of the denture, splitting the same into two parts. A first part may be comprised by the base part, which is placed on the patient's natural tissue. A second part surrounding the teeth may be comprised by the teeth part and configured to be mounted on the base part.

The split denture may, e.g., be a maxillary denture or a mandibular denture. For example, two digital 3D models of a denture may be provided: a first one may be maxillary denture and a second one may be a mandibular denture. Both digital 3D model may for example be split into a base part and a teeth part. Thus, a digital 3D model of the split maxillary denture and a 3D model of a split mandibular denture may be provided. Each of the two digital 3D model of split dentures may comprise a base part and a teeth part. Thus, a maxillary base part and a maxillary teeth part may be provided. Furthermore, a mandibular base part and a mandibular teeth part may be provided. The maxillary base part may comprise a first maxillary artificial gingiva portion and may be configured to support the maxillary teeth part. The maxillary teeth part may comprise a plurality of maxillary teeth of the maxillary denture and a second gingiva portion. The maxillary teeth part may be configured to be mounted on the maxillary base part. The mandibular base part may comprise a first mandibular artificial gingiva portion and may be configured to support the mandibular teeth part. The mandibular teeth part may comprise a plurality of mandibular teeth of the mandibular denture and a second gingiva portion. The mandibular teeth part may be configured to be mounted on the mandibular base part.

For example, the denture may be a complete denture. For example, a complete maxillary denture and/or a complete mandibular denture are configurated. Such a complete denture may be provided for an edentulous patient. A complete denture is intended to be worn on a patient's ridge, e.g., maxillary or mandibular ridge, missing all the teeth of the respective arch, i.e., maxillary or mandibular arch. Such a complete denture may provide a replacement for all the missing teeth of the respective arch. Providing a complete maxillary denture and a complete mandibular denture, all teeth of a teethless patient may be replaced.

For example, the denture may be a partial denture. For example, a partial maxillary denture and/or a partial mandibular denture are configurated. A partial denture is intended to be worn on a patient's ridge, e.g., maxillary or mandibular ridge, missing some of the natural teeth of the respective arch, i.e., maxillary or mandibular arch. Such a partial denture may provide a replacement for the missing teeth of the respective arch.

The denture may be a removable denture or a denture fixed in the patient mouth, e.g., by dental implants.

For example, the denture is a try-in denture. A try-in denture is a preliminary denture with is provided for testing. The testing may comprise testing the fit, aesthetics and/or maxillomandibular relation of the respective denture. The try-in denture may be configured for enabling adjustments to improve the denture's fit, aesthetics and/or maxillomandibular relation. The try-in denture may be generated and placed in the patient's mouth to evaluate the fit, aesthetics and/or maxillomandibular relation. Checking and verifying the maxillomandibular relationship established by the denture may, e.g., comprise verifying that centric occlusion and centric relation coincide and/or testing the patient's acceptance of the vertical dimension of occlusion established by the denture. It may further be determined, if the positions and form of the artificial teeth as well as the contours of the artificial gingiva provided by the denture are compatible with the surrounding oral environment of the individual patient. Furthermore, tooth selection and arrangement of the artificial teeth may be verified for proper aesthetics and phonetics. For example, it may be checked whether the tongue can be moved comfortably.

A try-in denture may be used to verify clinically all the procedures carried out in configuration and fabrication of the denture.

Using a split try-in denture may allow to use different materials or combinations of materials for generating. i.e., manufacturing the try-in base part and the try-in teeth part of the respective split try-in denture. The two parts, i.e., the try-in base part and the try-in teeth part, may be manufactured using different manufacturing devices. The different manufacturing devices may be optimized for using different materials or combinations of materials. The materials used may be optimized for different purposes. For example, a material used for the base part may be harder compared to a material used for the teeth part. This may ensure a tight fit of the base part which can be tested using the respective try-in base part. Furthermore, the try-in base part may provide a stable base for the try-in teeth part. The softer material used for manufacturing the try-in teeth part may allow for adjustments of the try-in teeth part. Once the adjusted try-in teeth part is determined to be satisfying, e.g., regarding fit, aesthetics and/or maxillomandibular relation, the adjusted try-in teeth part may be used as a template for a final teeth part of a final denture or the adjusted try-in teeth part may be used in combination with the base part as a template for a final denture.

Furthermore, using a split try-in denture may have the beneficial effect that the patient does not need to take out the denture and put in an alternative denture in order to test different versions of dentures. The patient may rather keep the base part in the mouth, while different teeth parts are tested until a best teeth part is found. Once the dentist in consultation with the patient has selected a teeth part, which is considered to be the best teeth part for the individual patient, it may be used as a template for the final denture.

For example, the denture may be a temporary denture intended for a temporary trial use to test the fitting of the denture design defined by the digital 3D model of the denture. For example, the denture may be a final denture, i.e., a denture finalized for a long-term use by the patient.

For example, the generated base part may be used for replacing a base part of an existing denture of the patient. Wearing a denture over a longer period of time may result in changes of the oral soft tissues and/or the bony architecture of the jaws supporting the denture. Such changes may cause an improper fit of the existing denture. The generated base part may be used to correct the fit of the denture, while an existing teeth part of the existing denture with an accurate occlusion may be further used.

For the purpose of replacement, the existing denture may be split in a base part and a teeth part. Alternatively, the existing denture may be reduced to the base part or the teeth part. For example, the digital 3D model of the denture is generated using scan data of the existing denture as well as an intraoral scan of the patient's natural oral tissue, i.e., the denture foundation base. As an alternative to the intraoral scan a scan of an impression of the patient's natural oral tissue may be used. The scan data of the existing denture may be scan data of the denture before the splitting or after the splitting. The scan data of the existing denture may be scan data of the full existing denture or scan data of a part of the existing denture, like the base part and/or the teeth part. The digital 3D model of the denture may result from an adjustment of the existing denture defined by the scan data of the existing denture to changes of the denture foundation base, i.e., the patient's natural oral tissue, defined by the intraoral scan data or the scan data of the impression. For example, a tissue side of the existing denture may be adjusted to implement an accurate adaption to the denture foundation base. For this purpose, the digital 3D model of the denture may be digitally adjusted. For example, a space, i.e., any gap, between the contours of the tissue side of the existing denture and current tissue contours of the patient's denture foundation base may be filled. For this purpose, the digital 3D model of the denture may be digitally amended to fill any gaps between the digital 3D model of the denture and a digital 3D representation of the contours, i.e., a surface of the patient's current natural tissue. Thus, changes of the patient's current tissue contours in comparison to the patient's tissue contours at the time of the generation of the existing denture, i.e., the tissue contours for which the existing denture has been adjusted, may be compensated.

The splitting of the denture may be performed manually or automatically using, e.g., a cutting or milling device. The splitting may be performed along a split curve defined by the splitting of the digital 3D model. For example, the geometry of the existing teeth part resulting from the splitting or reduction of the existing denture may correspond to the digital 3D model of the teeth part. A resulting mounting surface of the existing teeth part may be configured to fit onto the mounting surface of the base part. The mounting surfaces may, e.g., comprise mounting elements for establishing a non-destructive detachable connection between the existing teeth part and the base part. For example, the geometry of the existing base part resulting from the splitting or reduction of the existing denture may correspond to the digital 3D model of the base part. A mounting surface of the teeth part may be configured to fit onto the resulting mounting surface of the existing base part. The mounting surfaces may, e.g., comprise mounting elements for establishing a non-destructive detachable connection between the teeth part and the existing base part.

The base part may be connected to the existing teeth part for a try-in, for a temporary testing or for a permanent use. In case of a try-in or a temporary use, the connection may, e.g., be a non-destructive detachable connection. In case of a permanent use, the connection may, e.g., be a permanent connection. A permanent connection may, e.g., be established using an adhesive.

The teeth part may be connected to the existing base part for a try-in, for a temporary testing or for a permanent use. In case of a try-in or a temporary use, the connection may, e.g., be a non-destructive detachable connection. In case of a permanent use, the connection may, e.g., be a permanent connection. A permanent connection may, e.g., be established using an adhesive.

For example, the base part is a patient individual base part comprising a support surface configured to support the base part on a natural oral tissue of an individual patient. The geometry of the patient's natural oral tissue may be determined by an intraoral scan of the individual patient's mouth. The scanned data may be used to generate a digital 3D model of the surface of the patient's natural oral tissue. This surface may be used as a positive and a support surface of the digital 3D model of the denture may be provided as a negative of the respective positive in order to guarantee a tight and stable fit of the denture on the patient's natural oral tissue. Alternatively, an impression of the patient's natural oral tissue may be generated and scanned. In this case, the scan data may provide a negative of the surface of the patient's natural oral tissue. This negative may be used as template for the support surface of the digital 3D model of the denture. The patient individual support surface may be part of the patient individual base part.

For example, the base part comprises first connection elements. The teeth part comprises second connection elements. The first and second connection elements are configured to establish a non-destructive detachable connection between the base part and the teeth part, when the teeth part is mounted on the base part.

A non-destructive detachable connection between the base part and the teeth part may have the beneficial effect of providing a suitable connection between base part and teeth part, e.g., for testing the split denture. In addition, the teeth part may easily be detached, e.g., for adjustments or a replacement by an alternative teeth part.

For example, the base part may comprise one or more protrusions protruding from a mounting surface of the base part configured for mounting the teeth part thereon, while the teeth part comprises one or more receptions in a mounting surface of the teeth part configured for receiving the one or more protrusions of the base part. For example, each of the protrusions of the base part is arranged at a position aligned with a respective position of one of the receptions of the teeth part configured to receive the respective protrusion in order to establish the non-destructive detachable connection between base part and teeth part.

For example, the base part may comprise one or more receptions in a mounting surface of the base part configured for mounting the teeth part thereon. The one or more receptions may be configured for receiving the one or more protrusions of the teeth part. The respective one or more protrusions of the teeth part may be protruding from a mounting surface of the teeth part. For example, each of the receptions of the base part is arranged at a position aligned with a respective position of one of the protrusions of the teeth part. The receptions of the base part may be configured to receive the aligned protrusions of the teeth part in order to establish the non-destructive detachable connection between base part and teeth part.

For example, form, size and/or distribution of the protrusions and receptions may be patient individual. Thus, form, size and/or distribution of the protrusions and receptions may be determined to provide a non-destructive detachable connection between a patient individual base part and a patient individual teeth part.

For example, form, size and/or distribution of the protrusions and receptions may be generic. Thus, form, size and/or distribution of the protrusions and receptions may be predefined to provide a non-destructive detachable connection, e.g., between a patient individual base part and a generic individual teeth part. For example, a patient individual base part with the generic protrusions and/or receptions may be configured mounting different pre-manufactured teeth parts with generic protrusions and/or receptions thereon.

For example, the teeth part may be split as well. For example, the splitting of the denture may comprise an additional splitting of the resulting teeth part. The split teeth part may comprise multiple segments, i.e., be split into multiple segments. Each of the segments of the teeth part may, e.g., comprise a subset of the teeth of the teeth part as well as a part of the second gingiva portion of the teeth part. Each of the segments of the teeth part may, e.g., comprise a portion of the mounting surface of the teeth part. This may have the beneficial effect of enabling an exchange of individual segments of the teeth part.

For example, the segments of the teeth part may be connectable with each other. For example, each of the segments may comprise one or more third connection elements configured to establish a non-destructive detachable connection between the adjacent segments. The third connection elements may comprise protrusions and/or receptions. The receptions of each segment may be configured to receive the protrusions of an adjacent segment in order to establish the non-destructive detachable connection between the respective adjacent segments. For example, each protrusion of a segment may be arranged at a position aligned with a respective position of a reception of an adjacent segment.

For example, the method further comprises providing one or more digital 3D models of additional teeth parts. Each of the additional teeth parts comprises a different plurality of teeth and a further gingiva portion. Each of the additional teeth parts is configured to be mounted on the base part.

Providing a plurality of different teeth parts may enable a testing of different denture designs. The different teeth parts may differ regarding the arrangement, size, color, and/or shape of the teeth. Furthermore, the different teeth parts may differ regarding size, color, and/or shape of the artificial gingiva part of the individual teeth part.

For example, one or more digital 3D models of different teeth parts may be configured. The digital 3D models of the additional teeth parts may, e.g., be provided by digitally amending a first teeth part resulting from a split of a digital 3D model of a first denture. The digital 3D models of the additional teeth parts may, e.g., be provided by providing digital 3D models of additional dentures with identical patient individual support surfaces, but different artificial teeth and/or artificial gingivas. The differences may, e.g., relate to color, shape, size and/or arrangement. The digital 3D models of the additional dentures may each be split such that the resulting base parts are identical or highly similar, while the resulting teeth parts may differ. For example, identical splitting lines may be defined for splitting the digital 3D models of the additional dentures such that the form and size of the resulting base parts are identical, while form and size of the teeth parts may differ.

For example, a plurality of pre-defined digital 3D models of different teeth parts may be provided. This pre-defined digital 3D models may be adjusted in form and/or size to fit on a digital 3D model of a patient individual base part resulting from a splitting patient individual denture. A digital 3D model of the respective denture may be provided and split. The splitting may define a mounting surface of the resulting base part. The pre-defined digital 3D models of different teeth parts to be adjusted may be selected from a set of pre-defined digital 3D models of different teeth parts. The selected pre-defined teeth parts may each comprise a mounting surface for mounting the respective teeth part on a base part. The selected pre-defined teeth parts may each be adjusted such that the mounting surface of the respective selected pre-defined teeth part fits on the patient individual base part.

For example, the method further comprises generating at least one of the base part using the 3D model of the base part and the teeth part using the 3D model of the teeth part. The 3D model of the base part and the teeth part may be used as a template to generate, i.e., manufacture the respective base part and/or the teeth part. For generating the base part and/or the teeth part one or more manufacturing devices like, e.g., a 3D printing device for printing one or both parts or a machining device manufacturing one or both parts by machining, e.g., milling, of a blank.

For generating the base part and/or the teeth part, e.g., one of the following materials may be selected: poly(methyl methacrylate) (PMMA), polyether ether ketone (PEEK), resin, and wax. A 3D printing device may, e.g., use PMMA or resin for printing the base part and/or the teeth part. A machining device may, e.g., use a blank made of wax, PEEK, or PMMA for manufacturing the base part and/or the teeth part, e.g., by milling.

For example, both the base part and the teeth part are generated. For example, both parts are patient individual parts. For example, only the base part being a patient individual base part with a generic mounting surface may be generated, while the teeth parts may be generic teeth parts with generic mounting surfaces configured to fit onto the generic mounting surface of the patient individual bass part. The generic teeth parts may be provided in form of a set of pre-manufactured teeth parts.

For example, a different first material or different first combination of materials with a different first degree of hardness is used for generating the base part compared to a second material or second combination of materials with a second degree of hardness used for generating the teeth part.

Using different materials with different degrees of hardness for generating the base part and the teeth part may allow to optimize the base part and the teeth part for different purposes. For example, the base part may be optimized for ensuring a tight fit to the patient's natural oral tissue, while the teeth part may be configured for allowing adjustments to the patient's individual requirements during a clinical trial of the denture. For example, the denture may be a try-in denture.

For example, the first material or first combination of materials used for generating the base part is harder with the first degree of hardness being higher than the second degree of hardness of the second material or second combination of materials used for generating the teeth part. A harder first material or first combination of materials may ensure a tight fit of the base part to the patient's natural oral tissue, while a softer second material or second combination of materials may allow for adjustments of the teeth part.

For example, the first material or first combination of materials used for generating the base part is softer with the first degree of hardness being lower, i.e. softer, than the second degree of hardness of the second material or second combination of materials used for generating the teeth part.

For example, a first manufacturing device using the first material or first combination of materials is used for generating the base part and a second manufacturing device using the second material or second combination of materials is used for generating the teeth.

For example, two devices may be used to generate the two parts simultaneously. This may enable a fast generating of the two parts. The two devices may be of the same type or of different types.

For example, the same device may be used for the two parts successively. The respective device may, e.g., be provided with the first material or first combination of materials for generating the base part and may afterwards be provided with the second material or second combination of materials for generating the teeth part.

For example, the first and second manufacturing device each are selected from a group comprising a machining device and a 3D printing device. Using a machining device for machining a blank in order to generate the base part and/or the teeth part may allow for a fast on-site generation of the respective parts. Using a 3D printing device for printing the base part and/or the teeth part may allow for a fast on-site generation of the respective parts as well. For example, both parts may be generated using a machining device. For example, both parts may be using a 3D printing device. For example, one of the two parts may be generated using a machining device, while the other one is generated using a 3D printing device. For example, the base part may be printed by a 3D printing device, e.g., using PMMA, while the teeth part may be machined, e.g., milled, by a machining device using a blank, e.g., made from wax.

For example, the method further comprises generating one or more of the additional teeth parts using the one or more digital 3D models of the one or more additional teeth parts. The additional teeth parts may be made generated using the second material or second combination of materials. For example, the materials or combinations of materials used for generating additional teeth parts may all have the same second degree of hardness, e.g., for allowing adjustments. For example, the materials or combinations of materials used for generating additional teeth parts may only differ in color. For example, additional teeth parts may all be generated by the same manufacturing device, e.g., a 3D printing device or a machining device. For example, the additional teeth parts may be generated by a plurality of manufacturing devices of the same type, e.g., simultaneously.

By generating the one or more additional teeth parts using the second material or combination of materials, they may all have the same second degree of hardness. Thus, they may all have the same deformability in order to be able to adjust them to the individual requirements of the individual patient.

For example, the one or more additional teeth parts are generated using further materials or further combinations of materials having a further degree of hardness different from the first degree of hardness. For example, the further degrees of hardness may all be lower than the first degree of hardness. For example, the further degrees of hardness may all be higher than the first degree of hardness. For example, the further degrees of hardness may be identical with or similar to the second degree of hardness.

For example, the additional teeth parts are provided in form of pre-manufactured generic teeth parts, which are configured to be mounted on a generic mounting surface of the base part. Providing additional teeth parts are provided in form of pre-manufactured generic teeth parts may have the beneficial effect that only the patient individual base part may have to be generated, e.g., on-site. The pre-manufactured generic teeth parts may successively be connected to the base part and a pre-manufactured generic teeth part best fitting the individual requirements of an individual patient may be selected. The selected pre-manufactured generic teeth part may, e.g., be further adjusted to the individual requirements.

For example, the method further comprises establishing a permanent connection between the base part and the teeth part using an adhesive. The permanent connection may ensure that the base part and the teeth part may not be accidentally detached from each other. The base part and the teeth part permanently connected to each other may be a final base part and a final teeth part configured for providing a final denture. The base part and the teeth part permanently connected to each other may be a temporary base part and a temporary teeth part configured for providing a temporary denture. The temporary denture may be used for a temporary test, e.g., of a few days or weeks of a specific denture configuration. If the patient is satisfied with the respective denture configuration, a final denture with the same configuration may be provided. Otherwise, the configuration may be further adjusted to the patient's needs and wishes. Any visible indications of the splitting, like a slight gap or any irregularities along a splitting line, may be removed. For example, the gap may be filled with a filling material and/or the filled gape or any other irregularities may be removed by polishing the assembled denture.

For example, the method further comprises selecting one of the one or more additional teeth parts and establishing a permanent connection between the base part and the selected teeth part using the adhesive. For example, the additional teeth parts may be final teeth parts to be permanently connected to a final patient individual base part in order to provide a final denture. For example, the additional teeth parts may be temporary teeth parts to be permanently connected to a temporary patient individual base part in order to provide a temporary denture. The selected additional teeth part may be permanently connected to the patient individual base part. Any visible indications of the splitting, like a slight gap or any irregularities along a splitting line, between the additional teeth part and the patient individual base part may be removed. For example, the gap may be filled with a filling material and/or the filled gape or any other irregularities may be removed by polishing the assembled denture.

For example, the method further comprises providing an existing teeth part using an existing denture to be connected with the base part. The existing teeth part may, e.g., be provided by tooling the existing denture. The existing denture may, e.g., be split in an existing teeth part and an existing base part or the existing denture may be machined such that it is reduced to the existing teeth part. The existing denture may be a denture which has been generated by connecting an existing base part and an existing teeth part or a standard non-split denture. The splitting or machining may be performed manually or automatically using, e.g., a cutting device and/or a milling device. The existing denture may, e.g., be split or machined such that the resulting existing teeth part corresponds to the digital 3D model of the teeth part. The splitting or machining of the existing denture may be performed along a splitting curve defined for the digital 3D model, such that a resulting mounting surface of the existing teeth part fits onto the mounting surface of the base part. The mounting surfaces may, e.g., comprise mounting elements for establishing a non-destructive detachable connection between the existing teeth part and the base part. For example, the existing denture may have an improper fit due to changes of the patient's denture foundation over time. The base part may be adjusted to such changes of the patient's current denture foundation base, i.e., the soft tissue and/or bone structure of the patient, in comparison with the denture foundation base at the time, when the existing denture has been generated. The existing teeth part with an accurate occlusion may thus be reused, while the base part of the existing denture may be replaced by the adjusted base part.

The connection of the existing teeth part with the base part may, e.g., be a non-destructive detachable connection or a permanent connection. In case of a try-in or a temporary use, the connection may, e.g., be a non-destructive detachable connection. In case of a permanent use, the connection may, e.g., be a permanent connection. The permanent connection may, e.g., be established using an adhesive.

For example, the method further comprises providing an existing base part using an existing denture to be connected with the teeth part. The existing base part may, e.g., be provided by tooling the existing denture. The existing denture may, e.g., be split in an existing teeth part and an existing base part or the existing denture may be machined such that it is reduced to the existing base part. The existing denture may be a denture which has been generated by connecting an existing base part and an existing teeth part or a standard non-split denture. The splitting or machining may be performed manually or automatically using, e.g., a cutting device and/or a milling device. The existing denture may, e.g., be split or machined such that the resulting existing base part corresponds to the digital 3D model of the base part. The splitting or machining of the existing denture may be performed along a splitting curve defined for the digital 3D model, such that a resulting mounting surface of the teeth part fits onto the mounting surface of the existing base part. The mounting surfaces may, e.g., comprise mounting elements for establishing a non-destructive detachable connection between the teeth part and the existing base part. For example, in case teeth of the existing denture and/or the artificial gingiva surrounding the teeth of the existing denture are damaged, while the fit of the existing denture is still accurate, the damaged part may be replaced by the teeth part generated using the digital 3D model of the teeth part, while an existing base part may be provided using the existing denture.

The connection of the existing base part with the teeth part may, e.g., be a non-destructive detachable connection or a permanent connection. In case of a try-in or a temporary use, the connection may, e.g., be a non-destructive detachable connection. In case of a permanent use, the connection may, e.g., be a permanent connection. The permanent connection may, e.g., be established using an adhesive.

For example, the method further comprises defining a position of a splitting curve along which the digital 3D denture model is split. For example, the position of the splitting curve is defined automatically. For example, a definition of the position of the splitting curve is received in form of a user input. For example, the position of the splitting curve is defined using a user input. For example, the user selects a height parameter of the splitting curve. The splitting curve may extend in a splitting plane, which may extend parallel to a plane in which the teeth are arranged. The height parameter may define a distance between the teeth plane and the splitting plane. For example, the splitting curve, i.e., the split, may be placed automatically using the height parameter. For example, a best fitting split geometry for the patient arch may be selected or generated. The split geometry may, e.g., be selected from a set of predefined spit geometries. The split geometry may, e.g., be generated using the geometry and/or dimensions of the patient dental arch provided by the denture.

For example, the teeth part and/or the base part may be adjusted to the patient individual requirements. The method may further comprise receiving scan data of the adjusted teeth part and/or the adjusted base part. For example, the denture may have been tried and adjusted to the patient's individual requirements. The scan data may be used to automatically adjust the digital 3D model of the teeth part and/or the digital 3D model of the base part according to the scan data. The digital 3D model of the denture, of the base part and/or of the teeth part may be defined by a mesh structure. The mesh structure may be automatically adjusted according to the scan data and/or replaced by a mesh structure defined by the scan data. The adjusted digital 3D model of the teeth part and/or the adjusted digital 3D model of the base part may be used to generate a modified teeth part and/or a modified base part, e.g., using a 3D printing device and/or a machining device.

Alternatively, a modified denture, e.g., an unsplit denture, may be generated using the modified teeth part and/or a modified base part.

For example, scan data of an adjusted teeth part may be received, the 3D model of the teeth part may be adjusted using the scan data or may be replaced by a 3D model of the teeth part defined by the received scan data. The adjusted or replaced 3D model of the teeth part may be used for generating a modified teeth part, e.g., immediately on-site. The generated modified teeth part may be connected with the base part. The base part may have, e.g., been generated before. Alternatively, a modified denture, e.g., an unsplit denture, may be generated using the modified teeth part and the unmodified base part.

For example, the modified teeth part may be modified such that a borderless connection may be established between the modified teeth part and the base part. For implementing the borderless connection, the modified teeth part and in particular the mounting surface of the teeth part may be planned and produced more exactly with a finer granularity to reach a visual not detectable connection with the base part or a visual not detectable border of the respective connection.

For example, the modified teeth part may be further modified to provide an undetachable and seemly borderless connection with the base part, e.g., with or without using an adhesive. The modified teeth part may be generated using a material or combination of materials with a higher degree of hardness compared to the second material or second combination of materials used for generating the adjusted teeth part. For example, the modified teeth part may be generated using the first material or first combination of materials.

In another aspect, the invention relates to a system for configurating a split denture. The system comprising a computer device with a processor operatively coupled to a computer-readable storage medium storing computer-readable program instructions which, when executed by the processor, cause the processor to control the system to provide a digital 3D model of a denture, the denture comprising a plurality of teeth. The digital 3D model of the denture is split into a digital 3D model of a base part and a digital 3D model of a teeth part. The base part comprises a first artificial gingiva portion. Furthermore, the base part is configured to support the teeth part. The teeth part comprises the plurality of teeth of the denture and a second gingiva portion. The teeth part is configured to be mounted on the base part. The digital 3D model of the split denture is provided for generating at least one of the base part and the teeth part.

The system may be configured for configurating a split denture according to any of the aforementioned examples.

For example, the system further comprises a manufacturing device for generating at least one of the base part using the 3D model of the base part and the teeth part using the 3D model of the teeth part.

For example, the manufacturing device comprises a 3D printing device and/or a machining device.

For example, the system further comprises a scanning device configured for scanning an adjusted teeth part and/or an adjusted base part. For example, the teeth part and/or the base part may be adjusted to the patient individual requirements. The scanning device may be used to acquire scan data of the adjusted teeth part and/or the adjusted base part. For example, the denture may have been tried and adjusted to the patient's individual requirements. The scan data may be used to automatically adjust the digital 3D model of the teeth part and/or the digital 3D model of the base part according to the scan data. The digital 3D model of the denture, of the base part and/or of the teeth part may be defined by a mesh structure. The mesh structure may be automatically adjusted according to the scan data and/or replaced by a mesh structure defined by the scan data. The adjusted digital 3D model of the teeth part and/or the adjusted digital 3D model of the base part may be used to generate a modified teeth part and/or a modified base part, e.g., using a 3D printing device and/or a machining device of the manufacturing device. Alternatively, a modified denture, e.g., an unsplit denture, may be generated using the modified teeth part and/or a modified base part.

For example, scan data of an adjusted teeth part may be acquired using the scanning device, the 3D model of the teeth part may be adjusted using the scan data or may be replaced by a 3D model of the teeth part defined by the received scan data. The adjusted or replaced 3D model of the teeth part may be used for generating a modified teeth part, e.g., immediately on-site. The generated modified teeth part may be connected with the base part. The base part may have, e.g., been generated before. Alternatively, a modified denture, e.g., an unsplit denture, may be generated using the modified teeth part and the unmodified base part.

For example, the modified teeth part may be modified such that a borderless connection may be established between the modified teeth part and the base part. For implementing the borderless connection, the modified teeth part and in particular the mounting surface of the teeth part may be planned and produced more exactly with a finer granularity to reach a visual not detectable connection with the base part or a visual not detectable border of the respective connection.

For example, the modified teeth part may be further modified to provide an undetachable and seemly borderless connection with the base part, e.g., with or without using an adhesive. The modified teeth part may be generated using a material or combination of materials with a higher degree of hardness compared to the second material or second combination of materials used for generating the adjusted teeth part. For example, the modified teeth part may be generated using the first material or first combination of materials.

In another aspect, the invention relates to a computer program product comprising a non-volatile computer-readable storage medium having computer-readable program instructions embodied therewith for configurating a split denture. The execution of the computer-readable program instructions by a processor causes the processor to control a computer device to provide a digital 3D model of a denture, the denture comprising a plurality of teeth. The digital 3D model of the denture is split into a digital 3D model of a base part and a digital 3D model of a teeth part. The base part comprises a first artificial gingiva portion. Furthermore, the base part is configured to support the teeth part. The teeth part comprises the plurality of teeth of the denture and a second gingiva portion. The teeth part is configured to be mounted on the base part. The digital 3D model of the split denture is provided for generating at least one of the base part and the teeth part.

The computer-readable program instructions of the computer program product may be configured for configurating a split denture according to any of the aforementioned examples.

For example, the teeth part and/or the base part may be adjusted to the patient individual requirements. The computer device may further be controlled to receive scan data of the adjusted teeth part and/or the adjusted base part. For example, the denture may have been tried and adjusted to the patient's individual requirements. The scan data may be used to automatically adjust the digital 3D model of the teeth part and/or the digital 3D model of the base part according to the scan data. The digital 3D model of the denture, of the base part and/or of the teeth part may be defined by a mesh structure. The mesh structure may be automatically adjusted according to the scan data and/or replaced by a mesh structure defined by the scan data. The adjusted digital 3D model of the teeth part and/or the adjusted digital 3D model of the base part may be used to generate a modified teeth part and/or a modified base part, e.g., using a 3D printing device and/or a machining device. Alternatively, a modified denture, e.g., an unsplit denture, may be generated using the modified teeth part and/or a modified base part.

For example, scan data of an adjusted teeth part may be received, the 3D model of the teeth part may be adjusted using the scan data or may be replaced by a 3D model of the teeth part defined by the received scan data. The adjusted or replaced 3D model of the teeth part may be used for generating a modified teeth part, e.g., immediately on-site. The generated modified teeth part may be connected with the base part. The base part may have, e.g., been generated before. Alternatively, a modified denture, e.g., an unsplit denture, may be generated using the modified teeth part and the unmodified base part.

For example, the modified teeth part may be modified such that a borderless connection may be established between the modified teeth part and the base part. For implementing the borderless connection, the modified teeth part and in particular the mounting surface of the teeth part may be planned and produced more exactly with a finer granularity to reach a visual not detectable connection with the base part or a visual not detectable border of the respective connection.

For example, the modified teeth part may be further modified to provide an undetachable and seemly borderless connection with the base part, e.g., with or without using an adhesive. The modified teeth part may be generated using a material or combination of materials with a higher degree of hardness compared to the second material or second combination of materials used for generating the adjusted teeth part. For example, the modified teeth part may be generated using the first material or first combination of materials.

In another aspect, the invention relates to a split denture. The split denture comprises a plurality of teeth, wherein the denture is split into a base part and a teeth part. The base part comprises a first artificial gingiva portion. Furthermore, the base part is configured to support the teeth part. The teeth part comprising the plurality of teeth of the denture and a second gingiva portion. Furthermore, the teeth part is configured to be mounted on the base part.

The denture may be configured and generated according to any of the aforementioned examples.

For example, the base part is a patient individual base part comprising a support surface configured to support the base part on a natural oral tissue of an individual patient.

For example, the base part comprises first connection elements, while the teeth part comprises second connection elements. The first and second connection elements are configured to establish a non-destructive detachable connection between the base part and the teeth part, when the teeth part is mounted on the base part.

For example, one or more additional teeth parts are provided. Each of the additional teeth parts comprises a different plurality of teeth and a further gingiva portion. Each of the additional teeth parts is configured to be mounted on the base part.

The above described examples and embodiments may be combined freely as long as the combinations are not mutually exclusive.

In the following, embodiments of the invention are described in greater detail in which FIG. 1 shows an exemplary digital 3D model of a denture;

In the following similar features are denoted by the same reference numerals.

Figure 1:
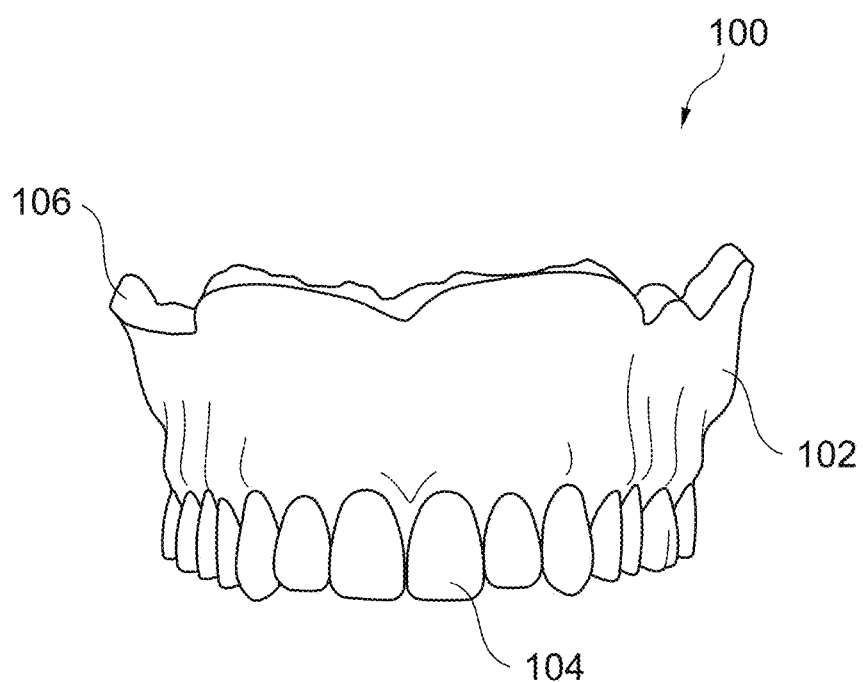

FIG. 1 shows an exemplary digital 3D model of a denture 100 before splitting. The exemplary denture 100 shown in FIG. 1 is a maxillary complete denture. The denture 100 may comprise an artificial gingiva 102 as well as a plurality of artificial teeth 104. Furthermore, the denture 100 may comprise a support surface 106 configured to support the denture 100 on the natural oral tissue of a patient, e.g., the natural oral tissue of a toothless maxillary jaw. The geometry of the support surface 106 may, e.g., be determined using scan data of an intraoral scan of a patient's mouth or a scan of an impression of the patient's fully or at least partially toothless jaws. The digital 3D models of the artificial teeth may for example be provided by a tooth library. The digital 3D model of a denture 100 may be generated for an individual patient. Instead of or in addition to the digital 3D model of the maxillary complete denture 100 shown in FIG. 1 a digital 3D model of a mandibular complete denture may be provided. Alternatively, a digital 3D model of a maxillary and/or mandibular partial denture may be provided.

Figure 2A:
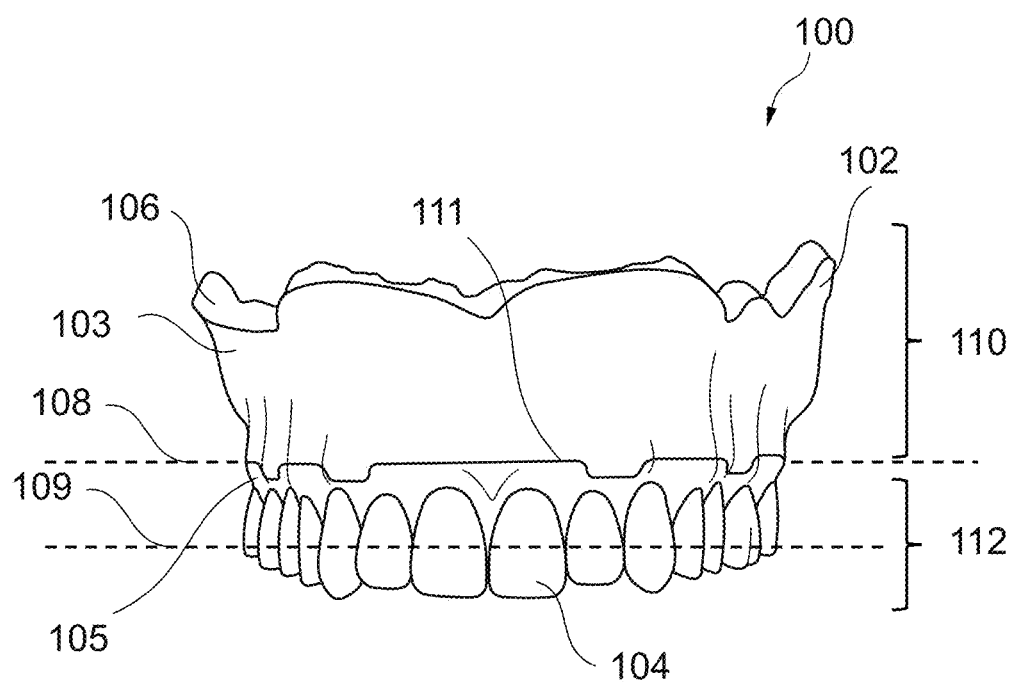
FIGS. 2A-2B show an exemplary digital 3D model of a split denture.
Figure 2B:
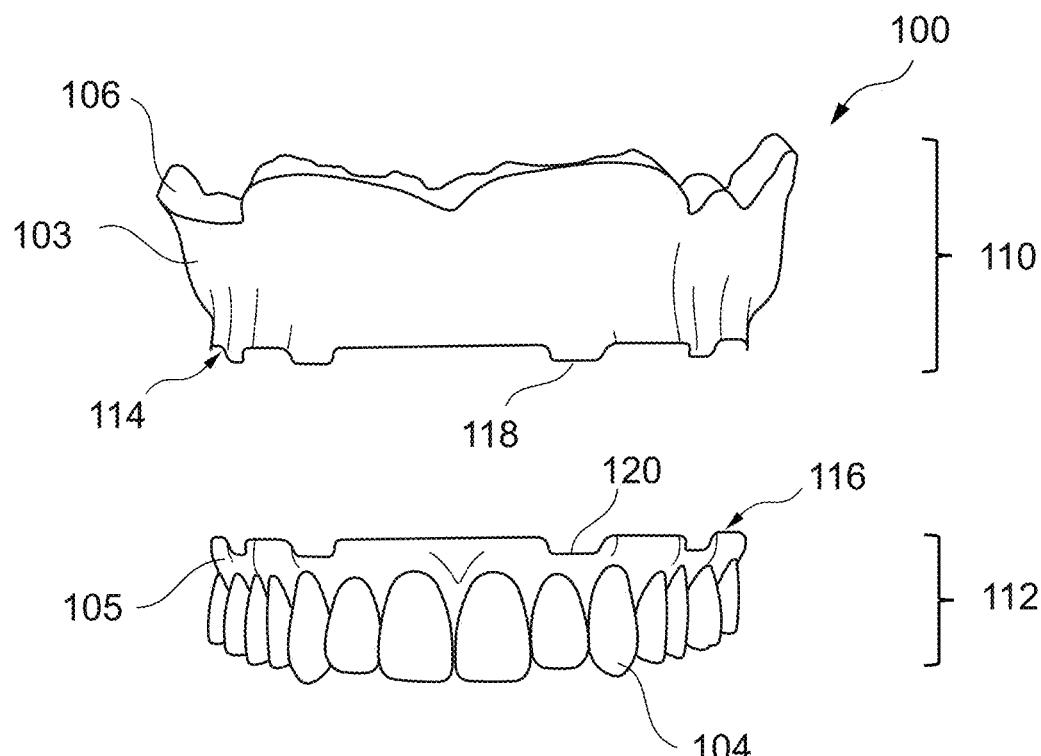

FIGS. 2A and 2B show an exemplary splitting of the digital 3D model of denture 100 of FIG. 1. FIG. 2A shows the digital 3D model of denture 100 split along a splitting line 111 into two parts, i.e., a digital 3D model of a base part 110 and a digital 3D model of a teeth part 112. A splitting plane 108 extends through the gingiva 102 of the denture 100 splitting the gingiva in two portions, a first portion 103 and a second portion 105. The splitting plane 108 may extend parallel to a plane 109 in which the teeth are arranged. The base part 110 comprises the first artificial gingiva portion 103 as well as the support surface 106 configured to support the base part 110 on the natural oral tissue of the patient. The base part 110 is further configured to support the teeth part 112. The teeth part 112 comprises the plurality of artificial teeth 104 of the denture 100 as well as the second gingiva portion 105 surrounding the artificial teeth 104. The teeth part 112 is configured to be mounted on the base part 110.

FIG. 2B shows the digital 3D model of the split denture 100 of FIG. 2A with the digital 3D model of a base part 110 and a digital 3D model of a teeth part 112 spaced apart from each other, i.e., disconnected from each other. The base part 110 comprises a first mounting surface 114 for mounting the teeth part 112 on the base part 110, while the teeth part 112 comprises a second mounting surface 116 fitting to the first mounting surface 114 in order to mount the teeth part 112 on the base part 110. The base part 110 comprises first connection elements 118, e.g., in the form of protrusions protruding from the first mounting surface 114 of the base part 110 configured for mounting the teeth part 112 thereon. The teeth part 112 comprises second connection elements 120, e.g., in the form of receptions in the second mounting surface 116 of the teeth part 112 configured for receiving the one or more protrusions 118 of the base part 110. The first and second connection elements 118, 120 may be configured to establish a non-destructive detachable connection between the base part 110 and the teeth part 112, when the teeth part 112 is mounted on the base part 110. For example, each of the protrusions 118 of the base part 110 is arranged at a position aligned with a respective position of one of the receptions 120 of the teeth part 112 configured to receive the respective protrusion 118 in order to establish the non-destructive detachable connection between base part 110 and teeth part 112.

Figure 3A:
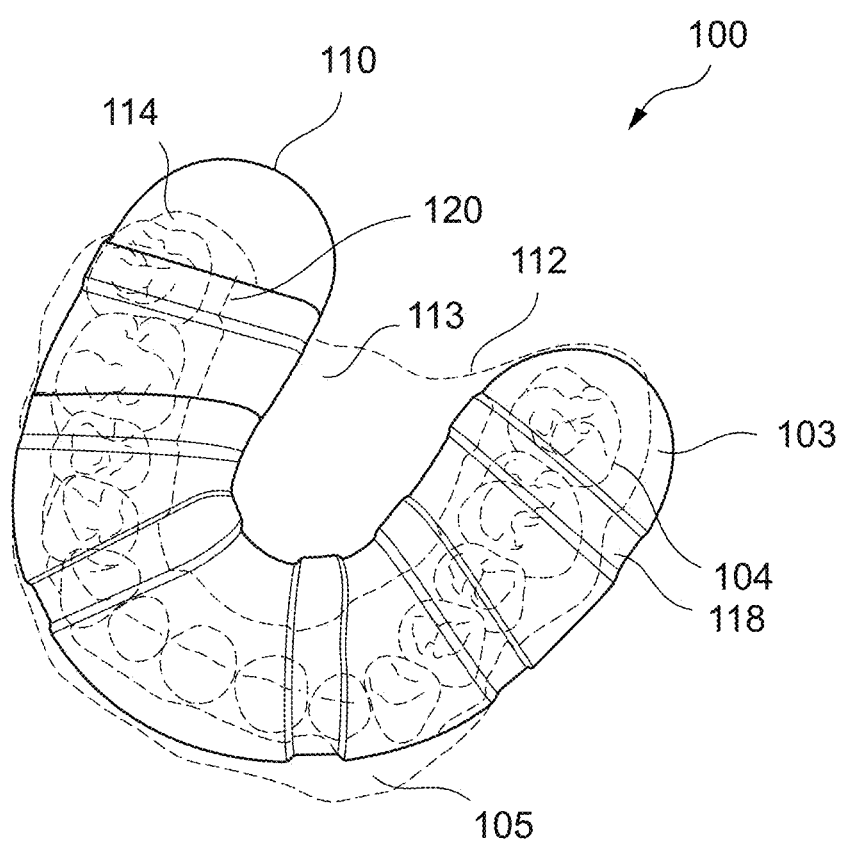
FIG. 3A-3C show an exemplary digital 3D model of a split denture.
Figure 3B:
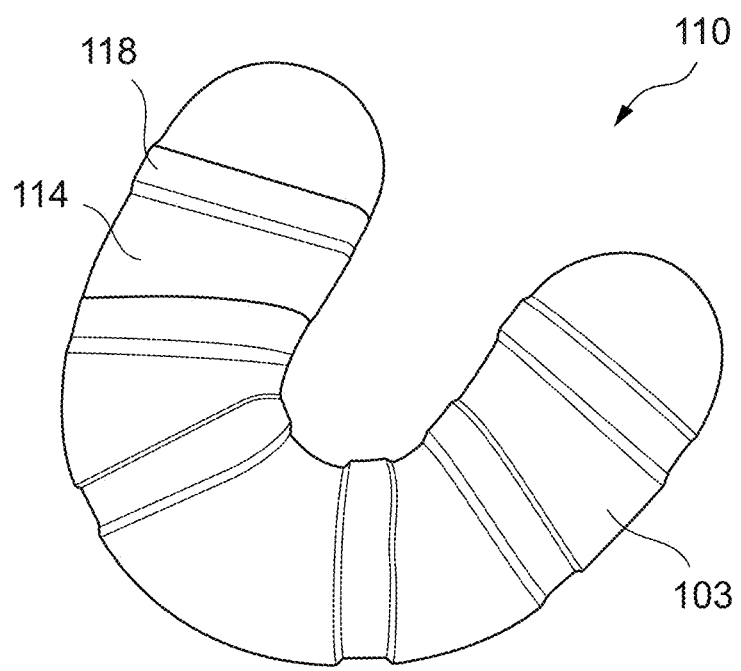
Figure 3C:
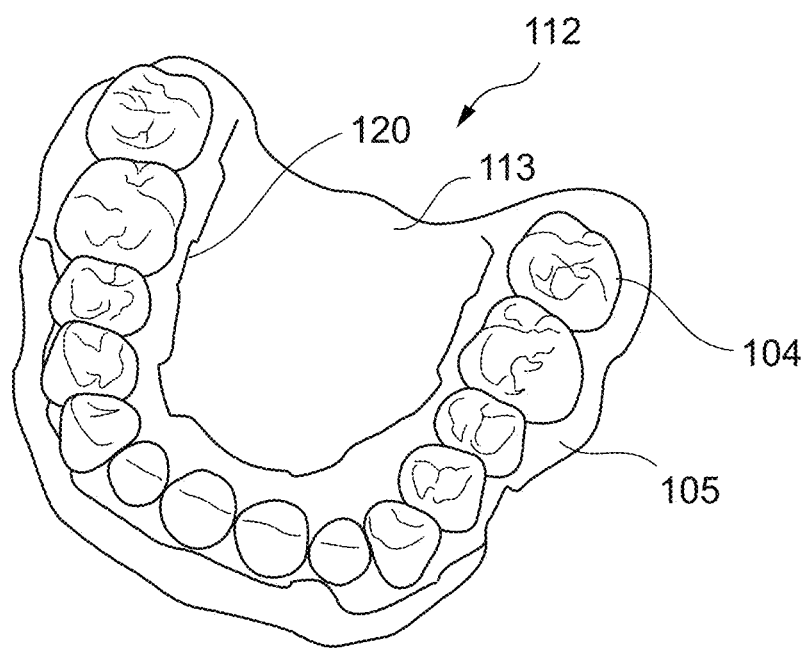

FIGS. 3A to 3C show an exemplary digital 3D model of a split denture 100. FIG. 3A shows a base part 110 of the digital 3D model of the split denture 100 indicated using solid lines, while the teeth part 112 is indicated using dashed lines. The teeth part 112 is arranged on the base part 110 and, e.g., mounted thereon using a non-destructive detachable connection between the base part 110 and the teeth part 112. The base part 110 comprises a first artificial gingiva portion 103 as well as a first mounting surface 114 for mounting the teeth part 112 on the base part 110. First connection elements 118 in form of ridges protruding from the first mounting surface 114 of the base part 110 are configured to interact with second connecting elements 120 of the teeth part in form of reception configured to receive the ridges 118 of the base part 110. By inserting the protruding ridges 118 into the receptions 120, a non-destructive detachable connection between base part 110 and teeth part 112 may be established. The base part 110 supports the teeth part 112 which is mounted on the mounting surface 114. The teeth part 112 comprises the plurality of artificial teeth 104 of the denture 100 as well as the second gingiva portion 105 surrounding the artificial teeth 104.

FIG. 3B shows the base part 110 of the split denture 100 of FIG. 3A, while FIG. 3C shows the teeth part 112 of the split denture 100 of FIG. 3A. In case of the split denture 100, the teeth part 112 may comprise a middle section 113 partially framed by the arch of teeth 104. The middle section 113 may, e.g., be configured to support the teeth part 112 and thus the split denture 100 on the natural oral tissue of the patient of the patient. This support may be implemented in addition to the support of the base part 110 on the natural oral tissue of the patient of the patient.

Figure 4A:
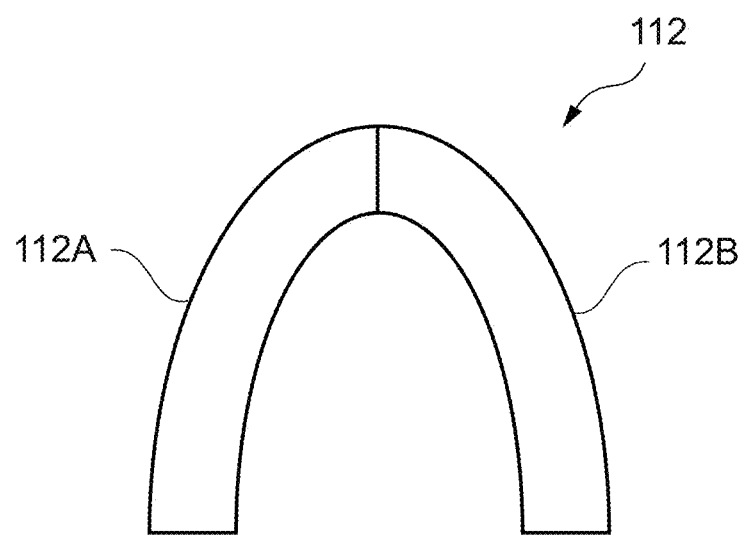
FIG. 4A-4B show an exemplary digital 3D model of a teeth part.
Figure 4B:
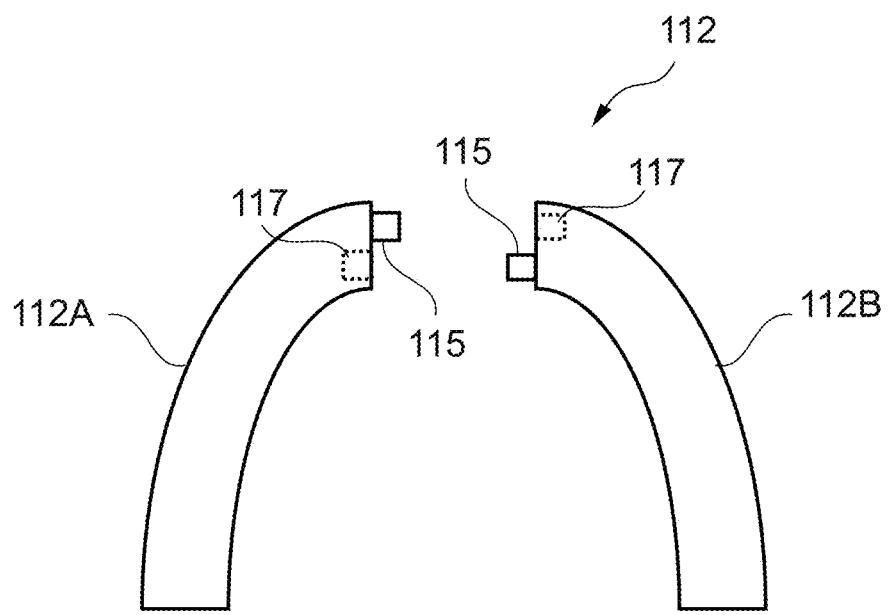

FIGS. 4A and 4B show an exemplary split teeth part 112. The teeth part 112 may be split as well. For example, the splitting of the denture may comprise an additional splitting of the resulting teeth part 112. The split teeth part 112 may comprise multiple segments 112A, 112B, i.e., be split into multiple segments 112A, 122B. FIGS. 4A and 4B show an exemplary teeth part 112, which is split into two segments, i.e., a first segment 112A and a second segment 112B. Each of the two segments may, e.g., comprise a subset of the teeth of the teeth part 112 as well as a part of the gingiva portion of the teeth part 112. FIG. 4A shows the two segments 112A, 112B of teeth part 112 connected with each other. FIG. 4B shows the two segments 112A, 112B of teeth part 112 spaced apart from each other. As shown in FIG. 4B, each of the segments 112A, 112B may comprise one or more connection elements 115, 117 configured to establish a non-destructive detachable connection between the segments 112A, 112B. The connection elements may comprise protrusions 115 as well as receptions 117. The receptions 117 may be configured to receive the protrusions 115 in order to establish the non-destructive detachable connection. For example, each of the protrusions 115 may be arranged at a position aligned with a respective position of one of the receptions 117.

Figure 5A:
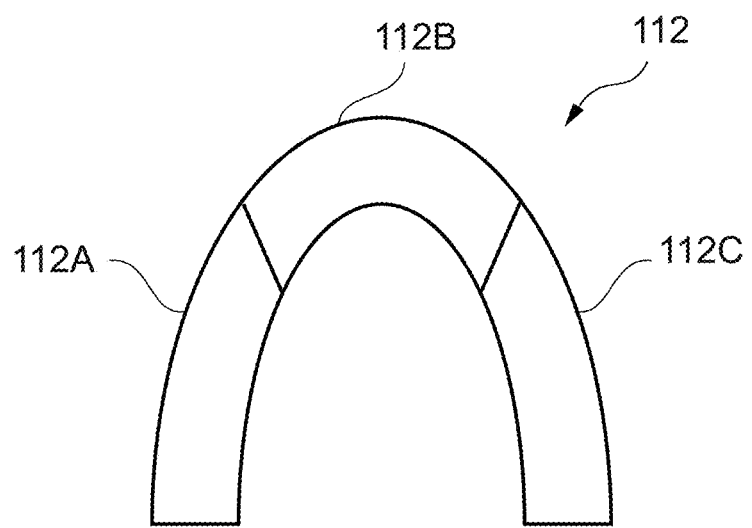
FIG. 5A-5B show an exemplary digital 3D model of a teeth part.
Figure 5B:
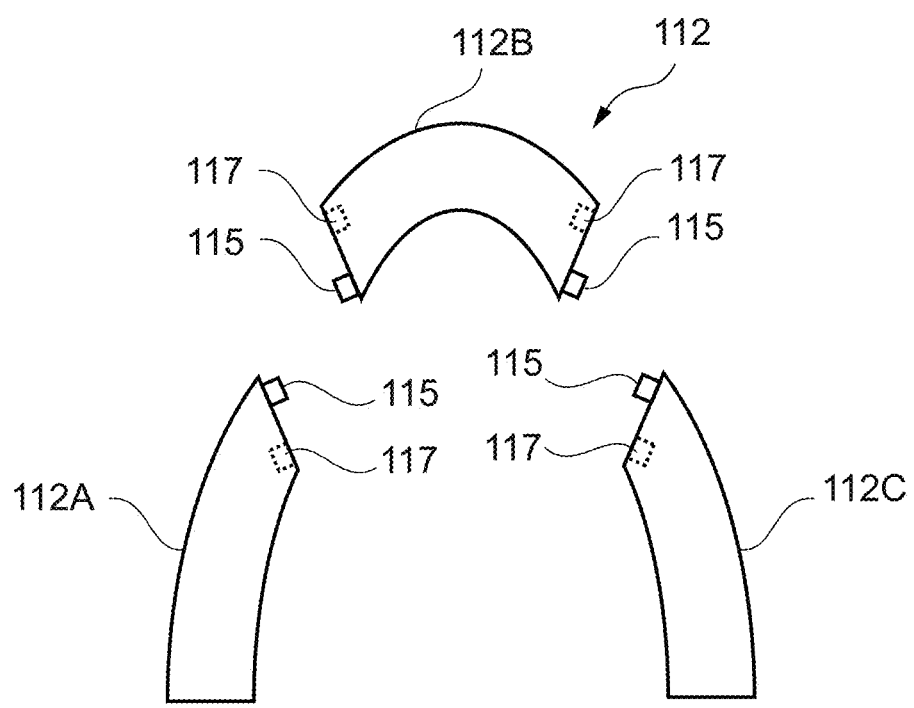

FIGS. 5A and 5B show another exemplary split teeth part 112, which is split into three segments, i.e., a first segment 112A, a second segment 112B and a third segment 112C. Each of the three segments may, e.g., comprise a subset of the teeth of the teeth part 112 as well as a part of the gingiva portion of the teeth part 112. FIG. 5A shows the three segments 112A, 112B, 112C of teeth part 112 connected with each other. FIG. 5B shows the three segments 112A, 112B, 112C of teeth part 112 spaced apart from each other. As shown in FIG. 5B, each of the segments 112A, 112B, 112C may comprise one or more connection elements 115, 117 configured to establish a non-destructive detachable connection between the segments 112A, 112B, 112C. The connection elements may comprise protrusions 115 as well as receptions 117. The receptions 117 may be configured to receive the protrusions 115 in order to establish the non-destructive detachable connection. For example, each of the protrusions 115 may be arranged at a position aligned with a respective position of one of the receptions 117.

Figure 6:
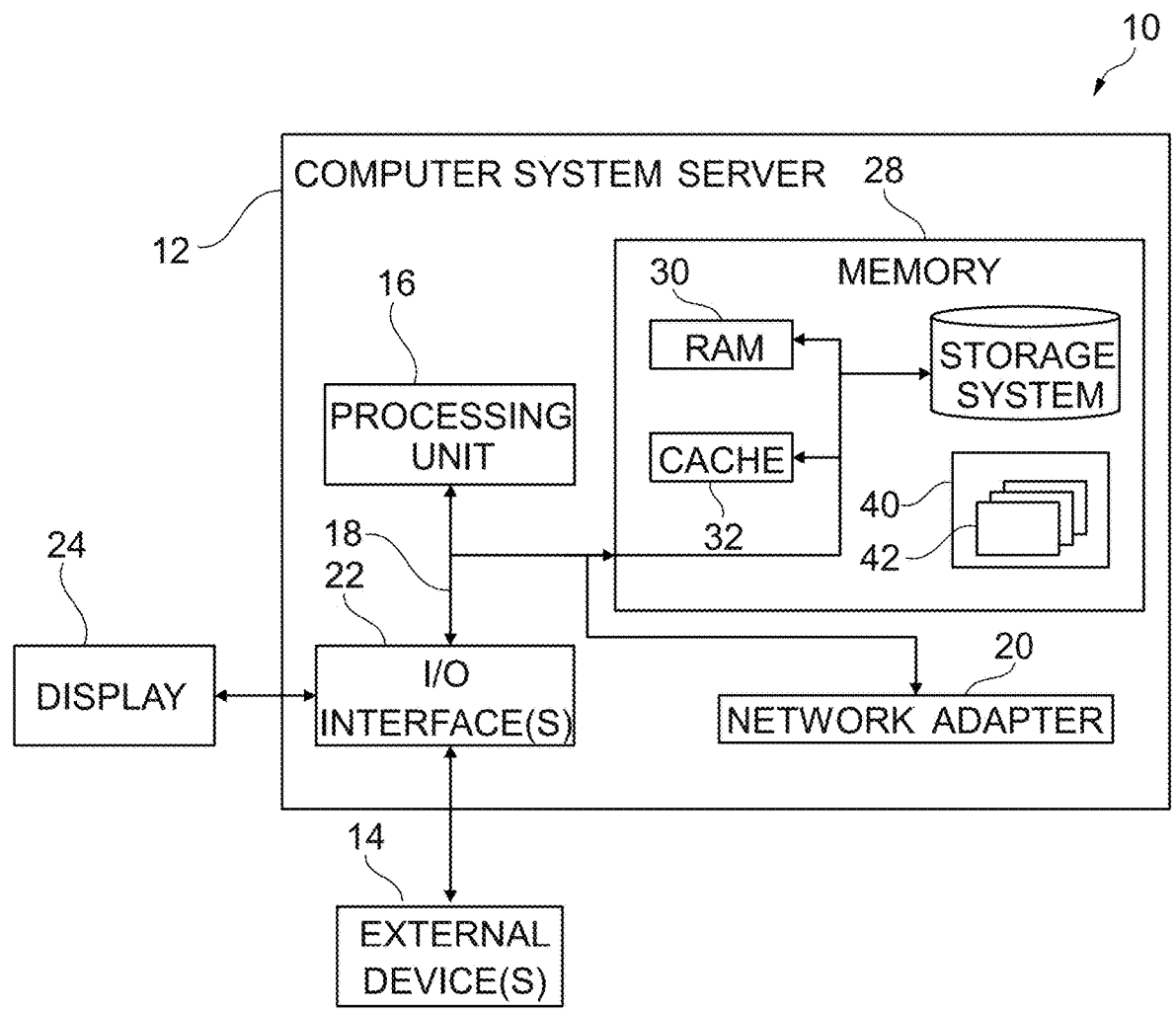
FIG. 6 shows an exemplary computer system for configurating a digital 3D model of a split denture.

FIG. 6 shows a schematic diagram of an exemplary computer system 10 of a system 105 for configurating a split denture. The denture to be split comprises a plurality of teeth. The digital 3D model of the denture is split into a digital 3D model of a base part and a digital 3D model of a teeth part. The base part comprises a first artificial gingiva portion and is configured to support the teeth part. The teeth part comprises the plurality of teeth of the denture and a second gingiva portion. The teeth part is configured to be mounted on the base part. The computer system 10 may be operational with numerous other general purpose or special purpose computing system environments or configurations.

Computer system 10 may be described in the general context of computer system executable instructions, such as program modules comprising executable program instructions, being executable by the computer system 10. Generally, program modules may include routines, programs, objects, components, logic, data structures, and so on that perform particular tasks or implement particular abstract data types. Computer system 10 may be practiced in distributed computing environments where tasks are performed by remote processing devices that are linked through a communications network. In a distributed computing environment, program modules may be located in both local and remote computer system storage media including memory storage devices.

In FIG. 6, computer system 10 is shown in the form of a general-purpose computing device. The components of computer system 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 10 may comprise a variety of computer system readable storage media. Such media may be any available storage media accessible by computer system 10, and include both volatile and non-volatile storage media, removable and non-removable storage media.

A system memory 28 may include computer system readable storage media in the form of volatile memory, such as random-access memory (RAM) 30 and/or cache memory 32. Computer system 10 may further include other removable/non-removable, volatile/non-volatile computer system storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may include at least one program product having a set of program modules, e.g., at least one program module, configured to carry out the configuration of the split denture.

Program 40 may have a set of one or more program modules 42 and by way of example be stored in memory 28. The program modules 42 may comprise an operating system, one or more application programs, other program modules, and/or program data. Each of the operating system, one or more application programs, other program modules, and program data or some combination thereof, may include an implementation of a networking environment. One or more of the program modules 42 may carry out the configuration of the split denture.

Computer system 10 may further communicate with one or more external devices 14 such as a keyboard, a pointing device, like a mouse, and a display 24 enabling a user to interact with computer system 10. Such communication can occur via input/output (I/O) interfaces 22. Computer system 10 may further communicate with one or more networks such as a local area network (LAN), a general wide area network (WAN), and/or a public network, like the Internet, via network adapter 20. Network adapter 20 may communicate with other components of computer system 10 via bus 18. It should be understood that although not shown, other hardware and/or software components could be used in conjunction with computer system 10.

The computer system 10 shown in FIG. 6 may be configured for configurating the split denture. The computer system 10 may be a standalone computer with no network connectivity that may receive data to be processed through a local interface. The data received by computer system 10 may for example comprise scan data of a patient's mouth from an intraoral scan or from a scan of a classical mold/impression, e.g., providing information about the surface structure of the patient's tissue on which the denture is to be placed. This data may be used to generate the digital 3D model of the denture. Alternatively, the data received may, e.g., comprise digital 3D model of the denture. The computer system 10 nay be used to define a splitting of the 3D model of the denture. Such operation may, however, likewise be performed using a computer system that is connected to a network such as a communications network and/or a computing network.

Figure 7:
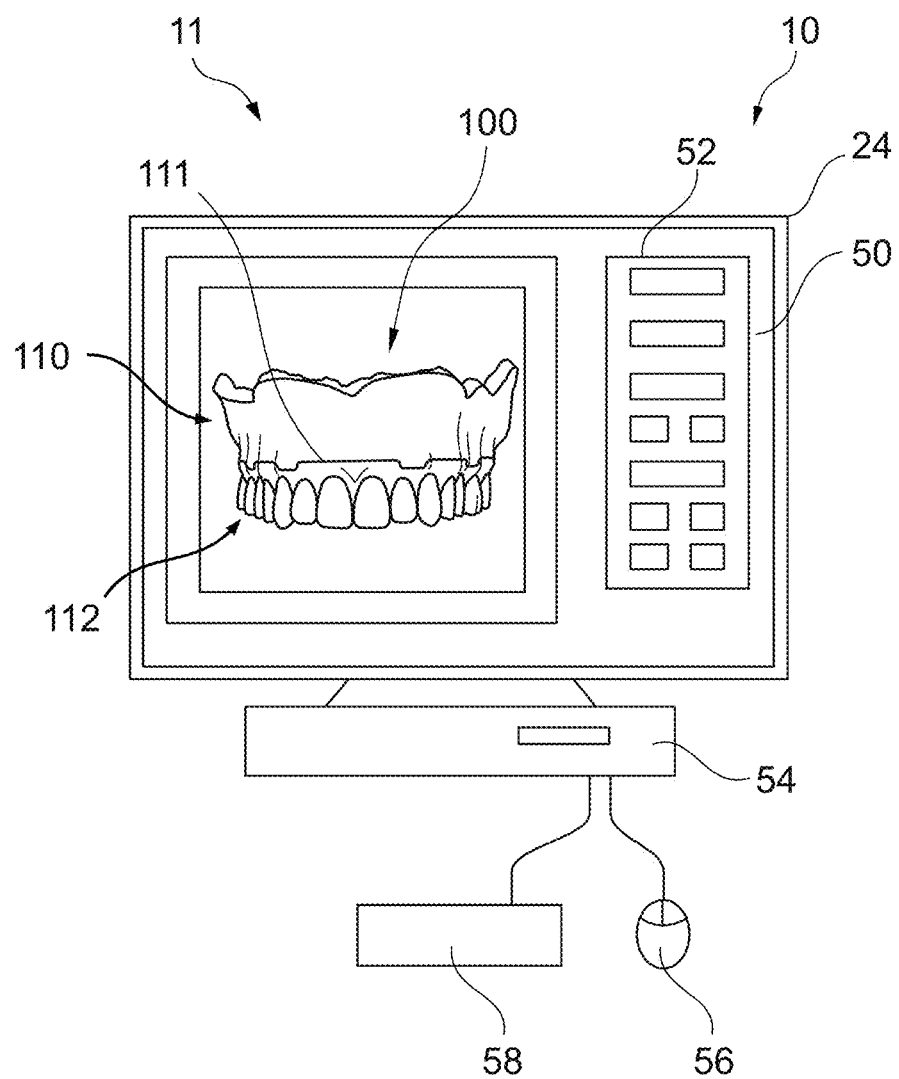
FIG. 7 shows an exemplary system for configurating a digital 3D model of a split denture.

FIG. 7 shows an exemplary system 11 comprising computer system 10 for configuring a digital 3D model of a split denture 100. The denture 100 is split into a base part 110 and a teeth part 112 along a splitting line 111. The computer system 10 may for example be configured as shown in FIG. 6. The computer system 10 may comprise a hardware component 54 comprising one or more processors as well as a memory storing machine-executable program instructions. Execution of the program instructions by the one or more processors may cause the one or more processors to control the computer system 10 to configurate the split denture 100. The computer system 10 may further comprise one or more input devices, like a keyboard 54 and a mouse 56, enabling a user to interact with the computer system 10. Furthermore, the computer system 10 may comprise one or more output devices, like a display 24 providing a user interface 50 with control elements 52 enabling the user to control the configurating of the split denture 100 using the computer system 10. The digital 3D model of a denture 100 may be shown on the user interface 50. Using the control elements 52 may, e.g., be used to initiate the splitting of the denture 100. For example, the splitting may be executed automatically. For example, the control elements 52 may be used to define position of the splitting line 111. For example, the height of the splitting plane relative to the teeth plane may be defined and/or adjusted using the control elements 52.

Figure 8:
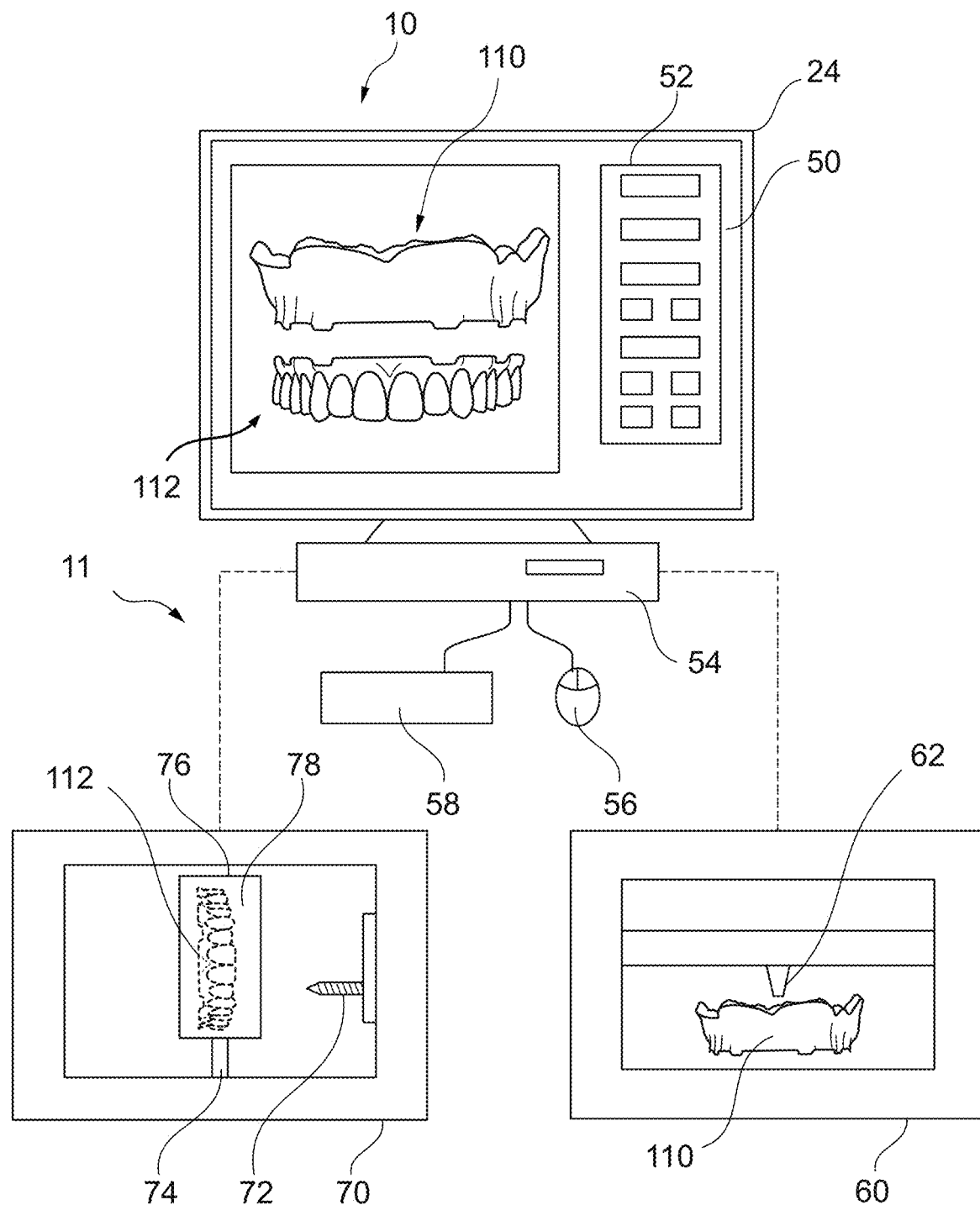
FIG. 8 shows an exemplary system for configurating and generating a digital 3D model of a split denture.

FIG. 8 shows an exemplary system 11 for configurating and generating a split denture 100 comprising a base part 110 and a teeth part 112. The system 11 may comprise the computer system 10 of FIG. 7. The computer system 10 may further be configured to control one or more manufacturing devices. For example, the system may comprise a first manufacturing device in form of a 3D printing device 60. The 3D printing device 60 may, e.g., be used for generating the base part 110 of the of the split denture 100 according to the digital 3D model of the split denture 100 configurated on the computer system 10. The 3D printing device 60 may comprise a printing element 62 configured to print the base part 110 layer by layer. For example, a first material or a first combination of materials is used for printing the base part 110 by the 3D printing device 60. The first material or a first combination of materials may have a first degree of hardness different from a second degree of hardness of a second material or a second combination of materials is used for generating the teeth part of the split denture. For example, the first degree of hardness may be higher than the second degree of hardness, i.e., the first material or a first combination of materials may be harder than the second material or the second combination of materials. The first material may, e.g., be PMMA.

The computer system 10 may further be configured to control a manufacturing device in form of a machining device 70 configured to machining a blank 76 using one or more machining tools 72. The blank 76 of raw material 78 may be provided using a holding device 74 and cut into a desired final shape and size of the component to be produced, like a teeth part 112, using the one or more machining tools 72 for executing a controlled material-removal process. The machining tool 72 may for example be a milling tool. The raw material 78 of the blank 76, i.e., the second material may, e.g., be wax.

Alternatively, the both the base part 110 as well as the teeth part 112 of the split denture 100 may be printed by the 3D printing device 60 using the same or different printing materials. Alternatively, the both the base part 110 as well as the teeth part 112 of the split denture 100 may be machined by the machining device 70 using blanks 76 made of the same or different raw materials 78.

Figure 9:
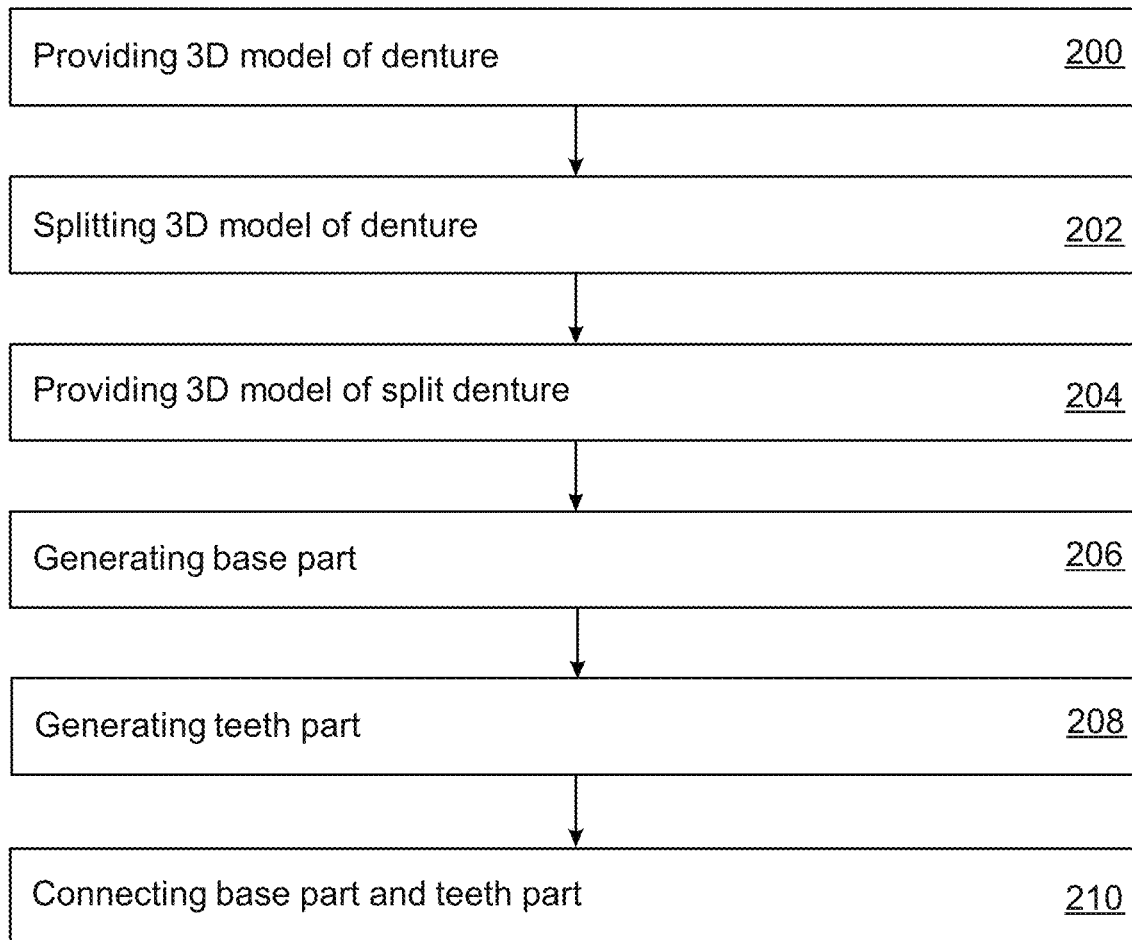
FIG. 9 shows a flowchart illustrating an exemplary method for configurating and generating a split denture.

FIG. 9 shows an exemplary method for configurating and generating a split denture. In block 200, a digital 3D model of a denture comprising a plurality of teeth is provided. The denture may, e.g., be a maxillary or mandibular complete denture. Alternatively, the denture may, e.g., be a maxillary or mandibular partial denture. In block 202, the digital 3D model of the denture is split into a digital 3D model of a base part and a digital 3D model of a teeth part. The base part may comprise a first artificial gingiva portion and be configured to support the teeth part. The base part may, e.g., be a patient individual base part comprising a support surface configured to support the base part on a natural oral tissue of an individual patient. The teeth part may comprise the plurality of teeth of the denture as well as a second gingiva portion. The teeth part may be configured to be mounted on the base part. In block 204, the digital 3D model of the split denture resulting from block 202 is provided for generating the base part and the teeth part. For example, the base part and the teeth part are generated using different materials or combinations of materials. In block 206, the base part is generated using a first material or a first combination of materials with a first degree of hardness different compared to a second material or second combination of material with a second degree of hardness used for generating the teeth part. The first material or first combination of materials used for generating the base part may, e.g., be harder with the first degree of hardness being higher than the second degree of hardness of the second material or second combination of material used for generating the teeth part with the second degree of hardness. For example, a first manufacturing device in form of a 3D printing device or a machining device may be used for generating the base part. In block 208, the teeth part is generated using the second material or second combination of materials with the second degree of hardness. For example, a second manufacturing device in form of 3D printing device or a machining device may be used for generating the base part.

In block 210, the base part and the teeth part are connected with each other to assemble the denture. The base part comprises first connection elements. The teeth part comprises second connection elements. The first and second connection elements may be configured to establish a non-destructive detachable connection between the base part and the teeth part, when the teeth part is mounted on the base part. For example, the base part may comprise one or more protrusions protruding from a mounting surface of the base part configured for mounting the teeth part thereon, while the teeth part comprises one or more receptions in a mounting surface of the teeth part configured for receiving the one or more protrusions of the base part. For example, each of the protrusions of the base part is arranged at a position aligned with a respective position of one of the receptions of the teeth part configured to receive the respective protrusion in order to establish the non-destructive detachable connection between base part and teeth part. For example, the base part may comprise one or more receptions in a mounting surface of the base part configured for mounting the teeth part thereon. The one or more receptions may be configured for receiving the one or more protrusions of the teeth part. The respective one or more protrusions of the teeth part may be protruding from a mounting surface of the teeth part. For example, each of the receptions of the base part is arranged at a position aligned with a respective position of one of the protrusions of the teeth part. The receptions of the base part may be configured to receive the aligned protrusions of the teeth part in order to establish the non-destructive detachable connection between base part and teeth part.

For example, the assembled denture may be a try-in denture with is placed in a patient's mouth and checks whether it is suitable regarding its fit, its mechanical features, its aesthetical features and/or its phonetical features.

During the clinical trial in the patient's mouth the teeth part may, e.g., be adjusted enabled by the softer second material or second combination of materials, while the harder first material or combination of materials of the base part ensures a tight fit of the denture and stable support of the teeth part. The resulting adjusted try-in denture may be used as template for generating a temporary or final denture.

For example, two dentures may be configured and generated, i.e., blocks 200 to 210 may be executed for each of the two dentures. A first one of the two dentures may, e.g., be a maxillary denture, like a complete or partial denture. A second one of the two dentures may, e.g., be a mandibular denture, like a complete or partial denture.

Figure 10:
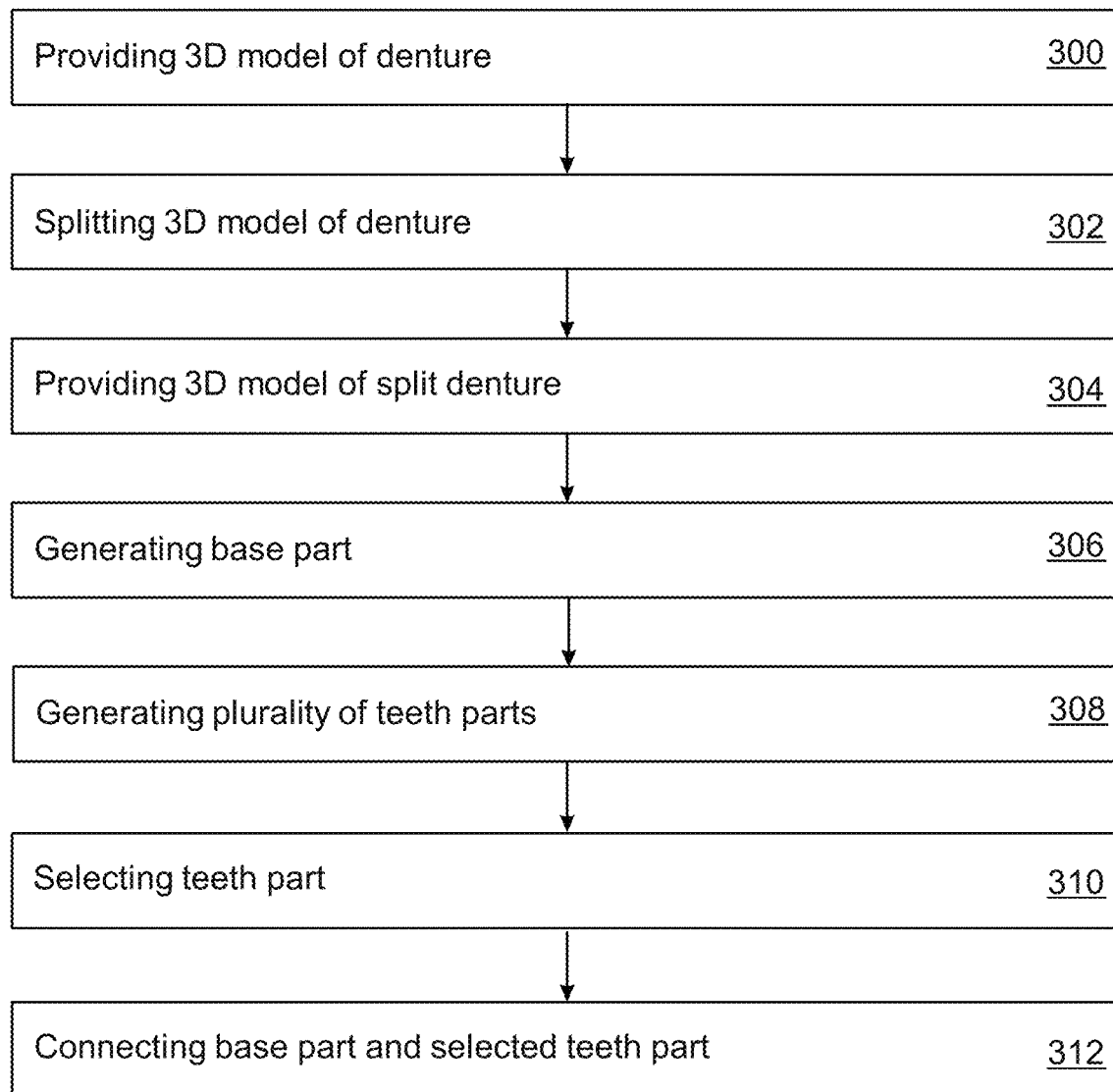
FIG. 10 shows a flowchart illustrating an exemplary method for configurating and generating a split denture.

FIG. 10 shows an exemplary method for configurating and generating a split denture. Blocks 300 to 306 of FIG. 10 may be identical to blocks 200 to 206 of FIG. 9. In block 308, not only a single teeth part, but a plurality of teeth parts may be generated. The teeth parts may differ in color, shape, size, and/or arrangement of the artificial teeth. The teeth parts may differ in color, shape, and/or size of their artificial gingiva portion. The different teeth parts may be configurated by amending the teeth part resulting from the splitting of the digital 3D model of the denture in block 302 or a plurality of digital 3D models of dentures may be provided in block 300 which are split in block 302 such that the resulting base parts are all identical, while the denture parts differ from each other. In block 310, one of the generated teeth parts is selected and in block 312 connected to base part. For example, the generated teeth parts are selected one after another and connected with the base part. For example, the base part may be placed in the patient's mouth and each of the teeth parts one after another may be mounted on the base plate. For each of the resulting combinations of the base part with one of the teeth parts, it may be checked whether the resulting try-in denture is suitable regarding its fit, its mechanical features, its aesthetical features and/or its phonetical features. The teeth part best fitting the patient's requirements may be chosen. As far as necessary, it may be further adjusted to the patient's requirements. During the clinical trial in the patient's mouth the teeth part chosen may, e.g., be adjusted enabled by the softer second material or second combination of materials, while the harder first material or combination of materials of the base part may ensure a tight fit of the denture and stable support of the teeth part. The resulting adjusted try-in denture may be used as template for generating a temporary or final denture.

Figure 11:
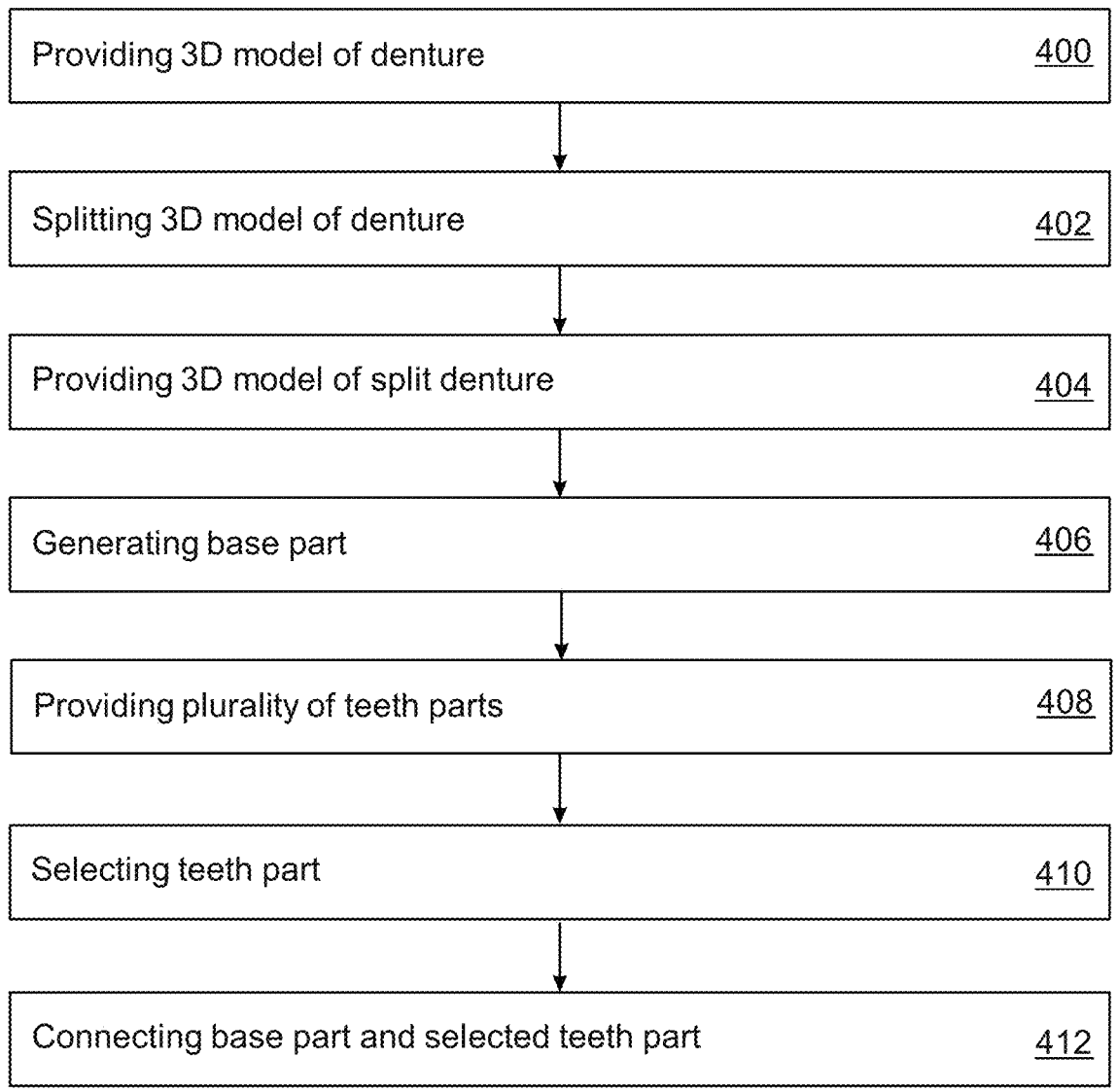
FIG. 11 shows a flowchart illustrating an exemplary method for configurating and generating a split denture.

FIG. 11 shows an exemplary method for configurating and generating a split denture. Blocks 400 to 406 of FIG. 11 may be identical to blocks 200 to 206 of FIG. 9. In block 408, not only a single teeth part, but a plurality of teeth parts may be provided. The teeth parts may, e.g., be provided in form of generic pre-manufactured teeth parts. The patient individual base part generated in block 406 may comprise a generic mounting surface configured for mounting the different generic pre-manufactured teeth parts thereon. The pre-manufactured teeth parts may differ in color, shape, size, and/or arrangement of the artificial teeth. The pre-manufactured teeth parts may differ in color, shape, and/or size of their artificial gingiva portion. In block 410, one of the teeth parts provided is selected and in block 412 connected to patient individual base part. For example, the provided teeth parts are selected one after another and connected with the base part. For example, the patient individual base part may be placed in the patient's mouth and each of the teeth parts one after another may be mounted on the patient individual base plate. For each of the resulting combinations of the patient individual base part with one of the teeth parts, it may be checked whether the resulting try-in denture is suitable regarding its fit, its mechanical features, its aesthetical features and/or its phonetical features. The generic pre-manufactured teeth part best fitting the patient's requirements may be chosen. As far as necessary, it may be further adjusted to the patient's requirements. During the clinical trial in the patient's mouth the teeth part chosen may, e.g., be adjusted enabled by a softer second material or second combination of materials, while the harder first material or combination of materials of the patient individual base part may ensure a tight fit of the denture and stable support of the teeth part. The resulting adjusted try-in denture may be used as template for generating a temporary or final denture.

Figure 12:
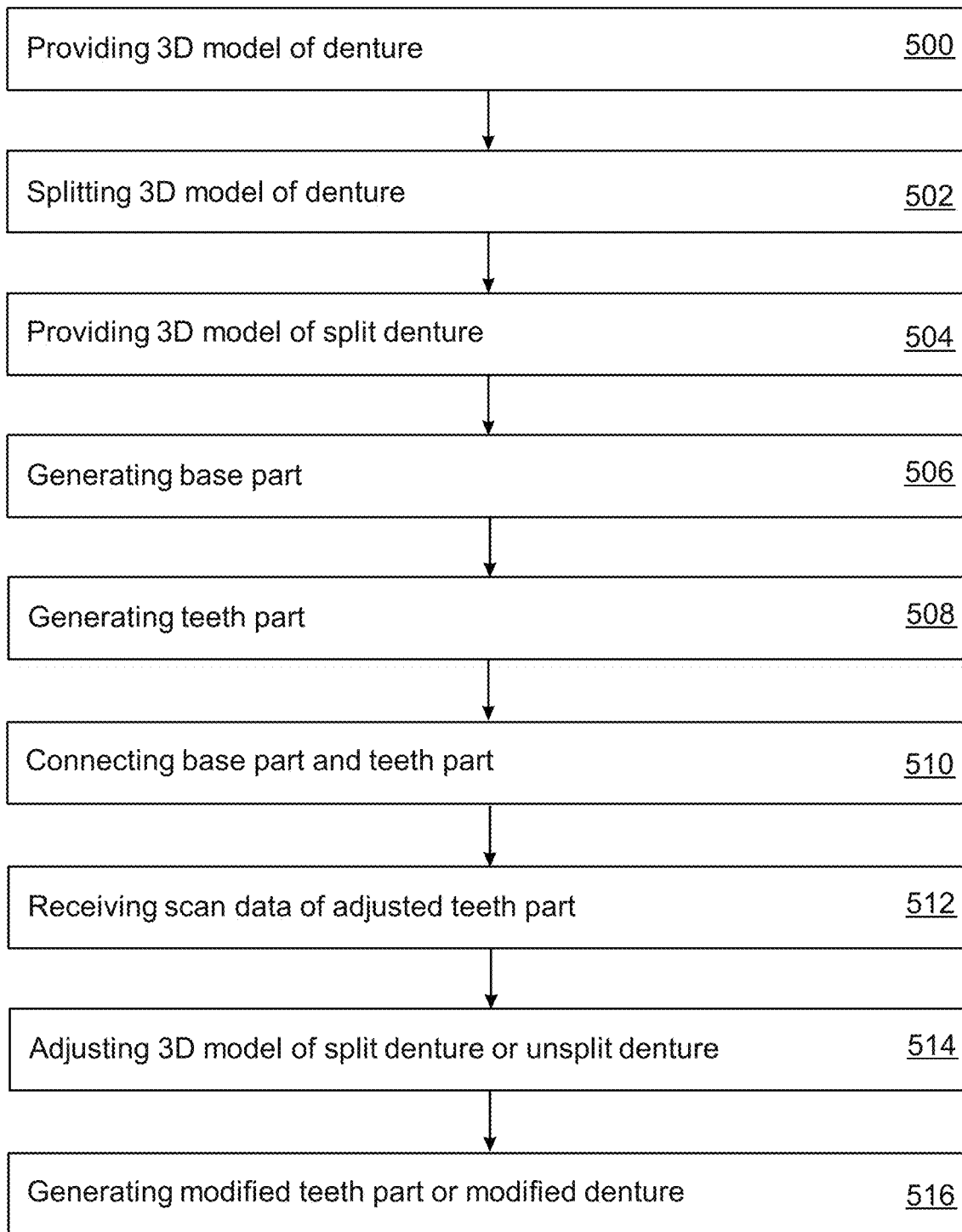
FIG. 12 shows a flowchart illustrating an exemplary method for configurating and generating a split denture.

FIG. 12 shows an exemplary method for configurating and generating a split denture. Blocks 500 to 510 of FIG. 12 may be identical to blocks 200 to 210 of FIG. 9. The teeth part generated in block 508 may be adjusted, e.g., during a clinical trial procedure using the try-in denture assembled in block 510. In block 512, scan data of a scan of the adjusted teeth part may be received. In block 514, the scan data received in block 512 may be used to adjust the digital 3D model of the split denture, i.e., the digital 3D model of the teeth part. Alternatively, the scan data may be used to adjust the 3D model of the unsplit denture, i.e., the 3D model of the original denture provided in block 500. In block 516, a modified teeth part is generated using the adjusted digital 3D model of the teeth part. The modified teeth part may be mounted on the base part. Alternatively, a modified unsplit denture is generated using the adjusted digital 3D model of the unsplit denture. The modified teeth part or the modified denture may be made of a harder material or a harder combination of materials than the teeth part adjusted. For example, the modified teeth part or the modified denture may be made of the same material as the base part in block 506. The methods of FIGS. 10 and 11 may be extended by additional steps similar to blocks 512 to 516.

Figure 13:
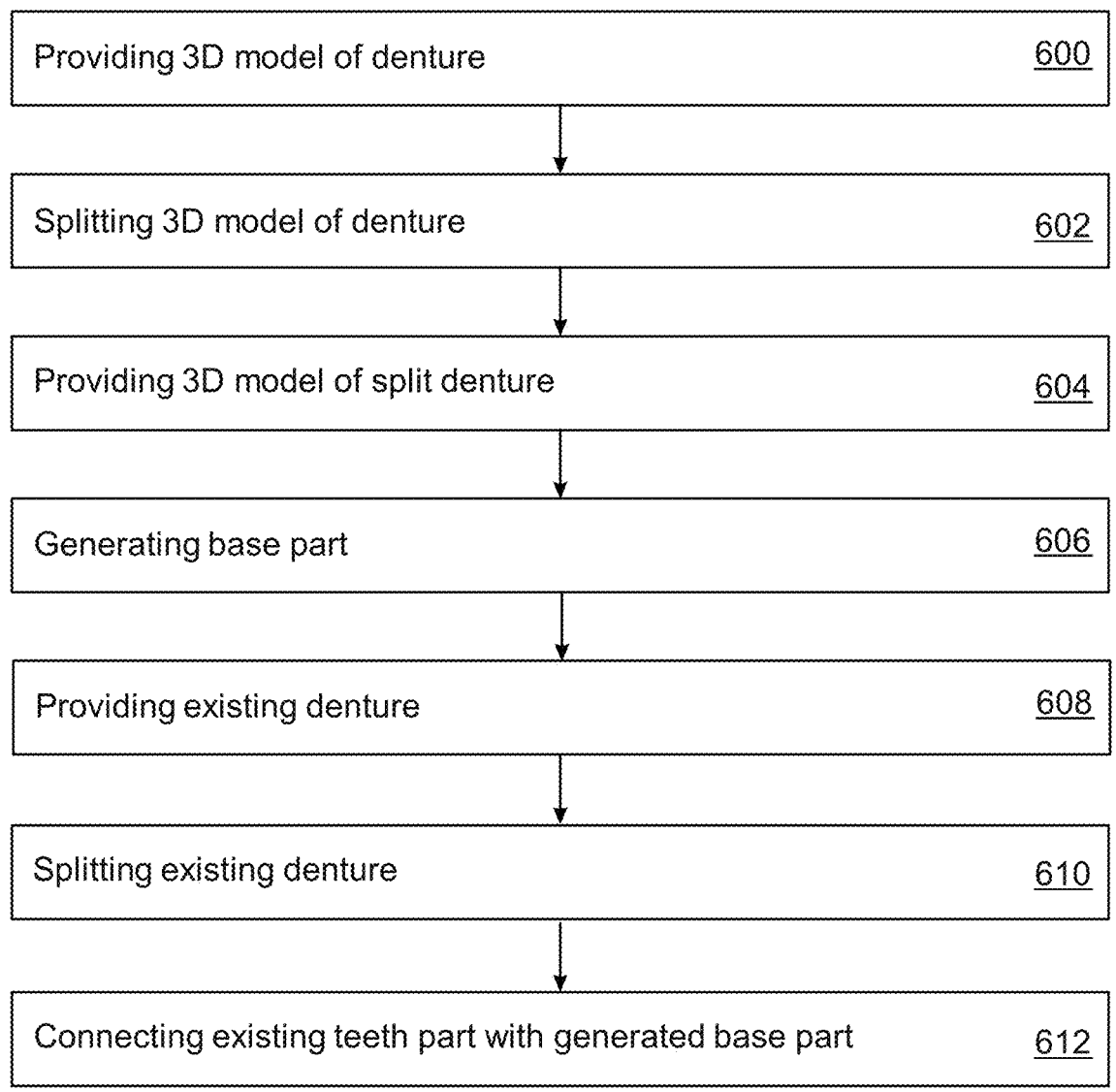
FIG. 13 shows a flowchart illustrating an exemplary method for configurating and generating a split denture using an existing denture.

FIG. 13 shows an exemplary method for configurating and generating a split denture using an existing denture. Blocks 600 to 606 of FIG. 13 may be identical to blocks 200 to 206 of FIG. 9. In block 608, an existing denture may be provided. In block 610, the existing denture may be split in order to provide an existing teeth part. In block 612, the existing teeth part resulting in block 610 may be connected with the base part generated in block 606. Thus, the fit of the existing denture on the patient's natural tissue may, e.g., be improved. The existing teeth part resulting in block 610 may comprise a mounting surface configured to fit onto a mounting surface of base part generated in block 606. The mounting surfaces may, e.g., comprise mounting elements for establishing a non-destructive detachable connection between the existing teeth part and the base part. Such an approach may correspond to a replacement of an existing base part of the existing denture. The connection of the existing teeth part with the base part may, e.g., be a non-destructive detachable connection or a permanent connection. In case of a try-in or a temporary use, the connection may, e.g., be a non-destructive detachable connection. In case of a permanent use, the connection may, e.g., be a permanent connection. A permanent connection may, e.g., be established using an adhesive. For example, the existing teeth part may result from a reduction of the existing denture, e.g., using a cutting device and/or a milling device, rather than a splitting.

For example, a teeth part may be provided in block 606 rather than a base part and from block 610 an existing base part may result rather than an existing teeth part. Thus, the occlusion of the existing denture on the patient's natural tissue may, e.g., be improved. The teeth part generated in block 606 may comprise a mounting surface configured to fit onto a mounting surface of existing base part resulting in block 610. The mounting surfaces may, e.g., comprise mounting elements for establishing a non-destructive detachable connection between the teeth part and the existing base part. Such an approach may correspond to a replacement of an existing teeth part of the existing denture.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks.

The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. In some embodiments, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Possible advantageous embodiments may comprise the following combinations of features:

1. A method for configurating a split denture, the method comprising:
   providing a digital 3D model of a denture, the denture comprising a plurality of teeth,
   splitting the digital 3D model of the denture into a digital 3D model of a base part and a digital 3D model of a teeth part,
      the base part comprising a first artificial gingiva portion, the base part further being configured to support the teeth part,
      the teeth part comprising the plurality of teeth of the denture and a second gingiva portion, the teeth part being configured to be mounted on the base part,
   providing the digital 3D model of the split denture for generating at least one of the base part and the teeth part.

2. The method of item 1, wherein the denture is a complete or a partial denture.

3. The method of any of the previous items, wherein the denture is a maxillary denture or a mandibular denture.

4. The method of any of the previous items, wherein the denture is a try-in denture.

5. The method of any of the previous items, wherein the base part is a patient individual base part comprising a support surface configured to support the base part on a natural oral tissue of an individual patient.

6. The method of any of the previous items, wherein the base part comprises first connection elements, wherein the teeth part comprises second connection elements, wherein the first and second connection elements are configured to establish a non-destructive detachable connection between the base part and the teeth part, when the teeth part is mounted on the base part.

7. The method of any of the previous items, wherein the method further comprises providing one or more digital 3D models of additional teeth parts, each of the additional teeth parts comprising a different plurality of teeth and a further gingiva portion, each of the additional teeth parts being configured to be mounted on the base part.

8. The method of any of the previous items, wherein the method further comprises generating at least one of the base part using the 3D model of the base part and the teeth part using the 3D model of the teeth part.

9. The method of item 8, wherein both the base part and the teeth part are generated.

10. The method of item 8 to 9, wherein for generating the base part a different first material or different first combination of materials with a different first degree of hardness is used compared to a second material or second combination of materials with a second degree of hardness used for generating the teeth part.

11. The method of item 10, wherein the first material or first combination of materials used for generating the base part is harder with the first degree of hardness being higher than the second degree of hardness of the second material or second combination of materials used for generating the teeth part or
   wherein the first material or first combination of materials used for generating the base part is softer with the first degree of hardness being lower than the second degree of hardness of the second material or second combination of materials used for generating the teeth part.

12. The method of any of previous items 10 to 11, wherein a first manufacturing device using the first material or first combination of materials is used for generating the base part and a second manufacturing device using the second material or second combination of materials is used for generating the teeth.

13. The method of item 12, wherein the first and second manufacturing device each are selected from a group comprising a machining device and a 3D printing device.

14. The method of any of previous items 7 to 13, wherein the method further comprises generating one or more of the additional teeth parts using the one or more digital 3D models of the one or more additional teeth parts.

15. The method of any of previous items 7 to 14, wherein the one or more additional teeth parts are generated using the second material or combination of materials.

16. The method of any of previous items 7 to 14, wherein the one or more additional teeth parts are generated using further materials or further combinations of materials having a further degree of hardness different from the first degree of hardness.

17. The method of any of previous items 7 to 13, wherein the additional teeth parts are provided in form of pre-manufactured generic teeth parts, which are configured to be mounted on a generic mounting surface of the base part.

18. The method of any of the previous items, wherein the method further comprises establishing a permanent connection between the base part and the teeth part using an adhesive.

19. The method of items 1 to 17, wherein the method further comprises selecting one of the one or more additional teeth parts and establishing a permanent connection between the base part and the selected teeth part using the adhesive.

20. The method of any of the previous items, wherein the method further comprises providing an existing teeth part using an existing denture to be connected with the base part.

21. The method of any of the previous items, wherein the method further comprises defining a position of a splitting curve along which the digital 3D denture model is split.

22. The method of claim 21, wherein the position of the splitting curve is defined automatically or wherein the position of the splitting curve is defined using a user input.

23. A system for configurating a split denture, the system comprising a computer device with a processor operatively coupled to a computer-readable storage medium storing computer-readable program instructions which, when executed by the processor, cause the processor to control the system to:
provide a digital 3D model of a denture, the denture comprising a plurality of teeth,
split the digital 3D model of the denture into a digital 3D model of a base part and a digital 3D model of a teeth part,
the base part comprising a first artificial gingiva portion, the base part further being configured to support the teeth part,
the teeth part comprising the plurality of teeth of the denture and a second gingiva portion, the teeth part being configured to be mounted on the base part,
provide the digital 3D model of the split denture for generating at least one of the base part and the teeth part.

24. The system of item 23, wherein the system further comprises a manufacturing device for generating at least one of the base part using the 3D model of the base part and the teeth part using the 3D model of the teeth part.

25. The system of item 24, wherein the system comprises a 3D printing device and/or a machining device as the manufacturing device.

26. A computer program product comprising a non-volatile computer-readable storage medium having computer-readable program instructions embodied therewith for configurating a split denture, wherein execution of the computer-readable program instructions by a processor causes the processor to control a computer device to:
provide a digital 3D model of a denture, the denture comprising a plurality of teeth,
split the digital 3D model of the denture into a digital 3D model of a base part and a digital 3D model of a teeth part,
the base part comprising a first artificial gingiva portion, the base part further being configured to support the teeth part,
the teeth part comprising the plurality of teeth of the denture and a second gingiva portion, the teeth part being configured to be mounted on the base part,
provide the digital 3D model of the split denture for generating at least one of the base part and the teeth part.

27. A split denture comprising a plurality of teeth, wherein the denture is split into a base part and a teeth part, the base part comprising a first artificial gingiva portion, the base part further being configured to support the teeth part, the teeth part comprising the plurality of teeth of the denture and a second gingiva portion, the teeth part further being configured to be mounted on the base part.

28. The split denture of item 27, wherein the base part is a patient individual base part comprising a support surface configured to support the base part on a natural oral tissue of an individual patient.

29. The split denture of any of previous items 27 to 28, wherein the base part comprises first connection elements, while the teeth part comprises second connection elements. The first and second connection elements are configured to establish a non-destructive detachable connection between the base part and the teeth part, when the teeth part is mounted on the base part.

30. The split denture of any of previous items 27 to 29, wherein the split denture is provided in form of an assembly set comprising one or more additional teeth parts, wherein each of the additional teeth parts comprises a different plurality of teeth and a further gingiva portion, wherein each of the additional teeth parts is configured to be mounted on the base part.

LIST OF REFERENCE NUMERALS 10 computer system
11 system
14 external device
16 processing unit
18 bus
20 network adapter
22 I/O interface
24 display
28 memory
30 RAM
32 cache
34 storage system
40 program
42 program module
50 user interface
52 control elements
54 hardware device
56 keyboard
58 mouse
60 3D printing device
62 printing element
70 machining device
72 machining tool
74 holding device
76 blank
78 raw material
100 denture
102 artificial gingiva
103 first portion of artificial gingiva
104 teeth
105 second portion of artificial gingiva
106 support surface
108 splitting plane
109 teeth plane
110 base part
111 splitting curve
112 teeth part
113 middle section
114 mounting surface 115 connection element
116 mounting surface
117 connection element
118 connection element
120 connection element

The invention claimed is:

1. A split denture comprising a plurality of teeth, wherein the denture is a try-in denture, wherein the denture is split into a base part and a teeth part, the base part comprising a first artificial gingiva portion, the base part further being configured to support the teeth part, the teeth part comprising the plurality of teeth of the denture and a second gingiva portion, the teeth part further being configured to be mounted on the base part,
    wherein the base part is generated from a different first material or different first combination of materials with a different first degree of hardness compared to a second material or second combination of materials with a second degree of hardness, from which the teeth part is generated,
    wherein the first material or the first combination of materials is harder with the first degree of hardness being higher than the second degree of hardness of the second material or the second combination of materials, the lower second degree of hardness allowing for adjustments by a dentist.

2. The split denture of claim 1, wherein the base part is a patient individual base part comprising a support surface configured to support the base part on a natural oral tissue of an individual patient.

3. The split denture of claim 1, wherein the base part comprises first connection elements, wherein the teeth part comprises second connection elements, wherein the first and second connection elements are configured to establish a non-destructive detachable connection between the base part and the teeth part, when the teeth part is mounted on the base part.

4. The split denture of claim 1, wherein the split denture further comprises one or more additional teeth parts, each of the additional teeth parts comprising a different plurality of teeth and a further gingiva portion, each of the additional teeth parts being configured to be mounted on the base part.

5. The split denture of claim 4, wherein the one or more additional teeth parts are generated from the second material or the second combination of materials.

6. The split denture of claim 4, wherein the one or more additional teeth parts are generated from a third material or third combination of materials having a further degree of hardness different from the first degree of hardness.

7. The split denture of claim 1, wherein the teeth part is mounted on the base part and a connection between the base part and the teeth part is a permanent connection established using an adhesive.

8. The split denture of claim 4, wherein one of the one or more additional teeth parts is a teeth part of another denture, wherein the respective additional teeth part is configured to be mounted on the base part.

* * * * *